(12) United States Patent
Katsuno et al.

(10) Patent No.: US 9,209,471 B2
(45) Date of Patent: Dec. 8, 2015

(54) FUEL CELL ASSEMBLY AND METHOD OF MANUFACTURING SAME, AND BONDING PART MANUFACTURING METHOD AND DEVICE

(71) Applicant: HONDA MOTOR CO., LTD., Tokyo (JP)

(72) Inventors: Masayuki Katsuno, Yaita (JP); Ryugo Fujitsuka, Utsunomiya (JP); Kenji Takenaka, Tokorozawa (JP); Gen Okiyama, Tokyo (JP); Ryo Uozumi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/357,152

(22) PCT Filed: Oct. 29, 2012

(86) PCT No.: PCT/JP2012/077865
§ 371 (c)(1),
(2) Date: May 8, 2014

(87) PCT Pub. No.: WO2013/069491
PCT Pub. Date: May 16, 2013

(65) Prior Publication Data
US 2015/0064600 A1     Mar. 5, 2015

(30) Foreign Application Priority Data

Nov. 10, 2011    (JP) .................................. 2011-246421

(51) Int. Cl.
*H01M 8/10*     (2006.01)
*H01M 8/02*     (2006.01)
(Continued)

(52) U.S. Cl.
CPC ............. *H01M 8/1004* (2013.01); *B32B 37/06* (2013.01); *B32B 37/10* (2013.01); *B32B 37/182* (2013.01);
(Continued)

(58) Field of Classification Search
None
See application file for complete search history.

(56) References Cited

U.S. PATENT DOCUMENTS

2002/0051902 A1*  5/2002  Suenaga et al. .................. 429/35
2005/0123819 A1*  6/2005  Hiroi et al. ....................... 429/36
(Continued)

FOREIGN PATENT DOCUMENTS

JP     05-234606      9/1993
JP     2001-118592    4/2001
(Continued)

OTHER PUBLICATIONS

Japanese Office Action dated Sep. 24, 2015, with partial English Translation, 5 pages.

*Primary Examiner* — Patrick Ryan
*Assistant Examiner* — Jose Colucci Rios
(74) *Attorney, Agent, or Firm* — Rankin, Hill & Clark LLP

(57) ABSTRACT

The present invention relates to a fuel cell assembly and method of manufacturing same, and a bonding part manufacturing method and device. For instance, in a resin frame, a depression part is subsidence formed from a lower-end face toward an upper-end face, and a housing hole is pass-through formed from a top surface of the depression part toward the upper-end face. For instance, the depression part, a cathode-side electrode and an electrolyte film are housed, and in such a circumstance, an anode-side electrode is housed in the housing hole. A portion of the resin frame permeates a gas diffusion layer which configures the anode-side electrode and is a porous body. Via the permeated site, the resin frame and the gas diffusion layer (anode-side electrode) are integrally bonded.

12 Claims, 18 Drawing Sheets

(51) Int. Cl.
  *B32B 37/06* (2006.01)
  *B32B 37/10* (2006.01)
  *B32B 37/18* (2006.01)
  *B32B 38/00* (2006.01)

(52) U.S. Cl.
  CPC ......... *B32B 38/0008* (2013.01); *H01M 8/0273* (2013.01); *H01M 8/0284* (2013.01); *H01M 8/0286* (2013.01); *B32B 2457/18* (2013.01); *H01M 2008/1095* (2013.01); *Y02E 60/50* (2013.01)

(56) References Cited

U.S. PATENT DOCUMENTS

2006/0073373 A1* 4/2006 Andrin et al. .................. 429/36
2009/0084676 A1* 4/2009 Shin et al. ................ 204/298.09
2009/0253014 A1* 10/2009 Tanahashi et al. ............. 429/30
2011/0027686 A1* 2/2011 Noda et al. .................... 429/483
2012/0009506 A1 1/2012 Tanahashi et al.

FOREIGN PATENT DOCUMENTS

| | | |
|---|---|---|
| JP | 2005-060748 | 3/2005 |
| JP | 2005-347255 | 12/2005 |
| JP | 2008-135295 | 6/2008 |
| JP | 2009-252479 | 10/2009 |
| JP | 2010-244689 | 10/2010 |
| JP | 2010-257925 | 11/2010 |
| JP | 2011-028852 | 2/2011 |

\* cited by examiner

FUEL CELL ASSEMBLY AND METHOD OF MANUFACTURING SAME, AND BONDING PART MANUFACTURING METHOD AND DEVICE

TECHNICAL FIELD

The present invention relates to a fuel cell assembly, and a method for producing (manufacturing) the same. The fuel cell assembly contains a membrane electrode assembly containing an anode and a cathode with a solid polymer electrolyte membrane interposed therebetween. The fuel cell assembly further contains a resin frame for supporting the membrane electrode assembly. The present invention further relates to a method and an apparatus (device) for producing a joined assembly (manufacturing a bonding part) by bonding a porous member made of a porous body and a resin member to each other.

BACKGROUND ART

A solid polymer electrolyte fuel cell contains a membrane electrode assembly prepared by interposing a solid polymer electrolyte membrane between an anode and a cathode. In this type of fuel cell, the membrane electrode assembly, and a resin frame for supporting the membrane electrode assembly may be integrally bonded to obtain a fuel cell assembly. A plurality of such fuel cell assemblies may be stacked to obtain a stack.

The technique described in Japanese Laid-Open Patent Publication No. 05-234606 has been known as a method for producing such a fuel cell assembly. According to this technique, an opening is formed in a frame-shaped (rectangular) resin frame, a portion in the vicinity of the opening is overlapped on an edge of an electrolyte membrane, and the overlapped portion is heated to form a heat-welded portion.

The electrolyte membrane absorbs and releases water that is generated during an electrode reaction of the fuel cell, whereby the electrolyte membrane is subjected to swelling and shrinkage. In the case that the resin frame and the electrolyte membrane are heat-welded as described in Japanese Laid-Open Patent Publication No. 05-234606, the welded portion of the electrolyte membrane may become denatured by the heat. In this case, the welded portion may become deteriorated in strength and damaged due to such swelling and shrinkage.

In the method proposed in Japanese Laid-Open Patent Publication No. 2008-135295, a portion of a resin frame is melted, the obtained melt is introduced into a gas diffusion layer in an anode or a cathode, and the introduced melt is cooled and solidified. The impact of heat on the electrolyte membrane is reduced in this method, as compared with the aforementioned process of heat-welding the electrolyte membrane directly with the resin frame.

The method described in Japanese Laid-Open Patent Publication No. 2008-135295 will be illustrated schematically. In FIG. 17, reference numeral 10 represents a membrane electrode assembly, and reference numeral 11 represents a resin frame. In this case, the membrane electrode assembly 10 contains a cathode 12, an electrolyte membrane 14, and an anode 16, which are stacked in this order from the bottom.

The cathode 12 contains a gas diffusion layer 18 made of carbon paper or the like, an underlayer 20, and an electrode catalyst layer 22, which are stacked in this order from the bottom. The anode 16 contains an electrode catalyst layer 24, an underlayer 26, and a gas diffusion layer 28 made of carbon paper or the like, which are stacked in this order from the bottom. The cathode 12 is wider than the anode 16, and thus an edge of the upper surface (facing the anode 16) of the electrolyte membrane 14 is exposed outside of the anode 16.

The resin frame 11 has a recess 30 that extends from the lower surface toward the upper surface, and a housing hole 32 formed as a through-hole and which extends from the ceiling surface of the recess 30 to the upper surface. During the process of bonding the resin frame 11 to the membrane electrode assembly 10, the gas diffusion layer 28 of the anode 16 is brought into contact with the ceiling surface of the recess 30, and then the upper surface is heated and pressed in the vicinity of the housing hole 32. A portion of the resin frame 11 is softened (or melted) and is made flowable by heating, such that the softened material penetrates into the gas diffusion layer 28.

Thereafter, the softened material, which is introduced into the gas diffusion layer 28, is solidified, whereby the resin frame 11 is bonded to the gas diffusion layer 28, i.e., to the anode 16.

SUMMARY OF INVENTION

As a practical matter, it is difficult to sufficiently melt the resin frame 11. Therefore, the resin frame 11 cannot be introduced sufficiently into the gas diffusion layer 28. As a result, as shown in FIG. 18, a gap is formed between the ceiling surface of the recess 30 and the electrolyte membrane 14. A fuel gas (such as a hydrogen-containing gas) and an oxygen-containing gas (such as air) are supplied respectively to the anode 16 and the cathode 12. In the case that the aforementioned gap is formed, the supplied gas leaks out from the gap.

In this case, the resin frame 11 protrudes slightly from the upper surface of the membrane electrode assembly 10. Thus, when fuel cell assemblies of this type are stacked, the thickness of the resultant stack is increased due to the protrusion. Furthermore, the electrolyte membrane or the carbon paper may become broken by a shear force that acts thereon as a result of the protrusion.

A general object of the present invention is to provide a fuel cell assembly capable of preventing gas leakage.

A principal object of the present invention is to provide a fuel cell assembly capable of preventing an increase in thickness of a stack.

Another object of the present invention is to provide a method for producing such a fuel cell assembly.

A further object of the present invention is to provide a method for producing a joined assembly, such as a fuel cell assembly, which is made up from a porous member and a resin frame.

A still further object of the present invention is to provide an apparatus for producing such a joined assembly.

According to an aspect of the present invention, there is provided a fuel cell assembly comprising a membrane electrode assembly and a resin frame for supporting the membrane electrode assembly, the membrane electrode assembly containing an anode and a cathode with a solid polymer electrolyte membrane interposed therebetween, wherein:

the resin frame has a recess that extends from one surface toward another surface, and further has a housing hole formed as a through-hole, which extends from a bottom surface or a ceiling surface of the recess to the other surface;

the electrolyte membrane and one of the anode and the cathode are placed in the recess;

the other of the anode and the cathode is placed in the housing hole;

the resin frame and at least one of the anode and the cathode are bonded to each other, such that a portion of the resin frame penetrates into the anode or the cathode; and an edge of the electrolyte membrane is exposed on an outside of an edge of at least one of the anode and the cathode and faces the bottom surface or the ceiling surface of the recess.

In the fuel cell assembly, the electrolyte membrane and the resin frame are not heat-welded. Therefore, denaturation by heat and deterioration in strength of the electrolyte membrane are prevented. Thus, damage of the electrolyte membrane due to swelling or shrinkage is prevented.

The electrolyte membrane and the resin frame are placed in contact with each other or are bonded by an adhesive or the like. Therefore, a gap is not formed between the electrolyte membrane and the resin frame, so that gas leakage does not occur.

The membrane electrode assembly is placed in the recess and the housing hole of the resin frame, such that the portion of the resin frame penetrates into the electrode. Therefore, the resin frame does not protrude from the membrane electrode assembly. Consequently, an increase in thickness of a stack of the fuel cell assemblies is prevented, and breakage of the electrolyte membrane or the gas diffusion layer (generally carbon paper) is prevented.

An elastomer may be interposed between and in contact with the bottom surface or the ceiling surface of the recess in the resin frame and the edge of the electrolyte membrane. In this case, a gap, which is formed between the resin frame and the electrolyte membrane, is filled with the elastomer, whereby gas leakage can be more easily prevented.

The edge of the electrolyte membrane may be exposed on the outsides of an edge of the anode and an edge of the cathode. In this case, another resin frame may be inserted into the recess of the resin frame, and the other resin frame and the other of the anode and the cathode that is not bonded to the resin frame may be integrally bonded to each other. Thus, similar to the case described above, integral bonding thereof is performed by a portion of the other resin frame penetrating into the other electrode.

According to another aspect of the present invention, there is provided a method for producing a fuel cell assembly containing a membrane electrode assembly and a resin frame for supporting the membrane electrode assembly, wherein the membrane electrode assembly contains an anode and a cathode with a solid polymer electrolyte membrane interposed therebetween, the method comprising the steps of:

placing the electrolyte membrane and one of the anode and the cathode in a recess, which extends from one surface toward another surface of the resin frame, and placing the other of the anode and the cathode in a housing hole, which is formed as a through-hole that extends from a bottom surface or a ceiling surface of the recess to the other surface;

heating an outer surface of the recess or the housing hole to generate a softened material and pressing the outer surface in order to introduce the softened material into the anode or the cathode; and hardening the softened material, which is introduced into the anode or the cathode, so as to bond the resin frame to the anode or the cathode. It should be noted that the term "softening" includes the meaning of "melting" in the present invention. Thus, the "softened material" includes the meaning of a "melted material".

The fuel cell assembly having the above-described structure can easily be produced by carrying out the aforementioned method steps.

The heating may be performed by, for example, laser irradiation, infrared ray irradiation, or the like. Alternatively, a heated jig may be pressed against the outer surface.

During the pressing step, a pressing jig may be pressed against the softened material. In this case, an area of a pressing surface of the pressing jig preferably is greater than an area of a melted portion of the resin frame. If a pressing jig is used in this manner, generation of burrs in the softened portion and the softened material of the resin frame is prevented.

During the step of heating the outer surface of the recess, an elastomer may be interposed between and in contact with the bottom surface or the ceiling surface of the recess and an edge of the electrolyte membrane, thereby obtaining a fuel cell assembly with the elastomer interposed therebetween. In this case, the fuel cell assembly exhibits a more excellent sealing property.

In the above manner, the resin frame may be integrally bonded to one of the anode and the cathode, and another resin frame may be inserted into the recess of the resin frame and integrally bonded to the other electrode, so as to obtain a fuel cell assembly with both electrodes thereof integrally bonded to respective resin frames. The other resin frame may be integrally bonded in the same manner as the former resin frame.

In this case, an outer surface of the other resin frame is heated in order to generate a softened material, and the softened material is introduced into the other of the anode and the cathode that is not bonded to the resin frame. Thereafter, the melt, which is introduced into the other electrode, is solidified, whereby the other resin frame and the other electrode can be integrally bonded.

In any case, a protrusion preferably is formed on a portion of the resin frame to be heated. In this case, a decrease in thickness caused by such penetration can be compensated for by the material in the protrusion.

Preferably, a load applied in the pressing step is substantially equal to a fastening pressure of a stack of the fuel cell assemblies. In this case, the stack can exhibit a sufficient sealing property.

According to a further aspect of the present invention, there is provided a method for producing a joined assembly by bonding a resin member to a porous member made of a porous body, comprising the steps of:

arranging an edge of the porous member and an edge of the resin member in facing relation to each other on a positioning jig so as to form a facing portion;

pressing the facing portion using a pressing member;

bringing a heating member into contact with the pressing member for pressing the facing portion, heating the heating member in order to transfer heat to the pressing member and the facing portion, heating the pressing member and the facing portion, and introducing a portion of the resin member into the porous member; and separating the heating member from the pressing member, thereby stopping heating, while continuously pressing the facing portion using the pressing member, so as to harden the portion of the resin member that was introduced into the porous member.

In the case that the resin material, which is introduced into the porous member, is pressed by the heating member, when the heating member is separated from the facing portion, the melted resin material remains attached to the heating member and extends therefrom in the form of strings. Thus, a so-called stringing effect of the material is caused. In contrast, in the present invention, heat is transferred from the heating member, through the pressing member, and to the facing portion. Therefore, even if the heating member becomes separated from the pressing member after softening of the resin material, such stringing is not caused.

Furthermore, since the heating member is separated away from the pressing member, residual heat of the heating member can easily be prevented from being transferred to the facing portion.

In the step of stopping heating while continuously pressing the facing portion using the pressing member, preferably at least one of the pressing member and the positioning jig is cooled. In this case, the joined assembly is prevented from warping, and the resin material that is introduced into the porous member is effectively hardened. Thus, the joined assembly can be produced efficiently without warping.

In any case, a protrusion preferably is formed in the vicinity of an edge of the resin member, and the protrusion is pressed by the pressing member. Thus, a decrease in thickness caused by such penetration can be compensated for by the material in the protrusion, in the same manner as described above.

A recess preferably is formed in advance in the vicinity of the protrusion on the resin member. In such a structure, a portion of the softened material flows from the protrusion into the recess. Thus, formation of a raised portion on the resin frame due to blocking of the flow of the softened material can be prevented.

According to a still further aspect of the present invention, there is provided a bonding apparatus for bonding a resin member to a porous member made of a porous body comprising:

a positioning jig on which the porous member and the resin member are placed;

a pressing member for pressing a facing portion, which is formed by arranging bonding surfaces of the porous member and the resin member in facing relation to each other on the positioning jig;

a heating member which is heatable and which is capable of moving closer to or farther away from the pressing member;

a heating unit for heating the heating member;

a first displacement mechanism for moving the pressing member closer to or farther away from the facing portion; and a second displacement mechanism for moving the heating member closer to or farther away from the pressing member.

In this structure, heat of the heating member is transferred through the pressing member to the facing portion, thereby preventing occurrence of the aforementioned stringing effect. Consequently, a joined assembly (such as a fuel cell assembly) can be efficiently produced without requiring after-treatments to compensate for stringing.

Preferably, the bonding apparatus further comprises at least one of a cooling unit for cooling the pressing member and a cooling unit for cooling the positioning jig. If cooling by the cooling unit is carried out, warping of the joined assembly can be prevented. Furthermore, the resin material that is introduced into the porous member can be hardened more efficiently.

A protrusion may be formed convexly in the vicinity of an edge of the resin member. In this case, the protrusion may be pressed by the pressing member.

DESCRIPTION OF EMBODIMENTS

Figure 1:
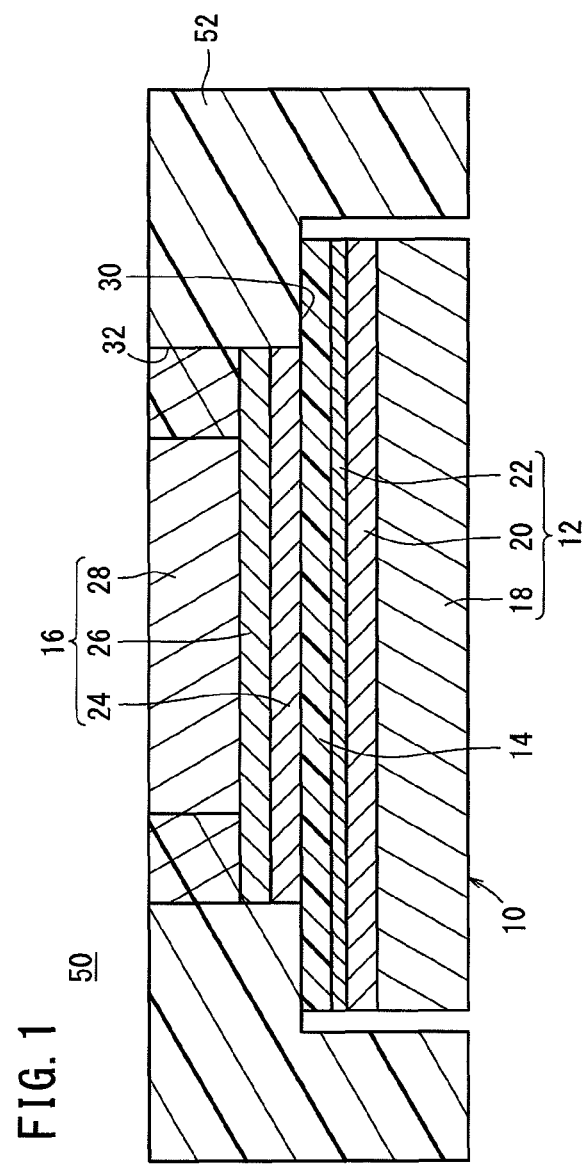
FIG. 1 is an overall schematic vertical cross-sectional view of a fuel cell assembly according to a first embodiment of the present invention.

Several preferred embodiments of the fuel cell assembly, the fuel cell assembly production method, the joined assembly production method, and the apparatus of the present invention will be described in detail below with reference to the accompanying drawings. Incidentally, constituent elements of the embodiments, which are the same as the constituent elements shown in FIGS. 17 and 18, are denoted using the same reference numerals, and detailed explanations of such features are omitted.

Initially, a first embodiment of a fuel cell assembly and a production method therefor will be described below. FIG. 1 is an overall schematic vertical cross-sectional view of a fuel cell assembly 50 according to the first embodiment. The fuel cell assembly 50 contains a membrane electrode assembly 10, and a resin frame 52 for supporting the membrane electrode assembly 10.

Figure 17:
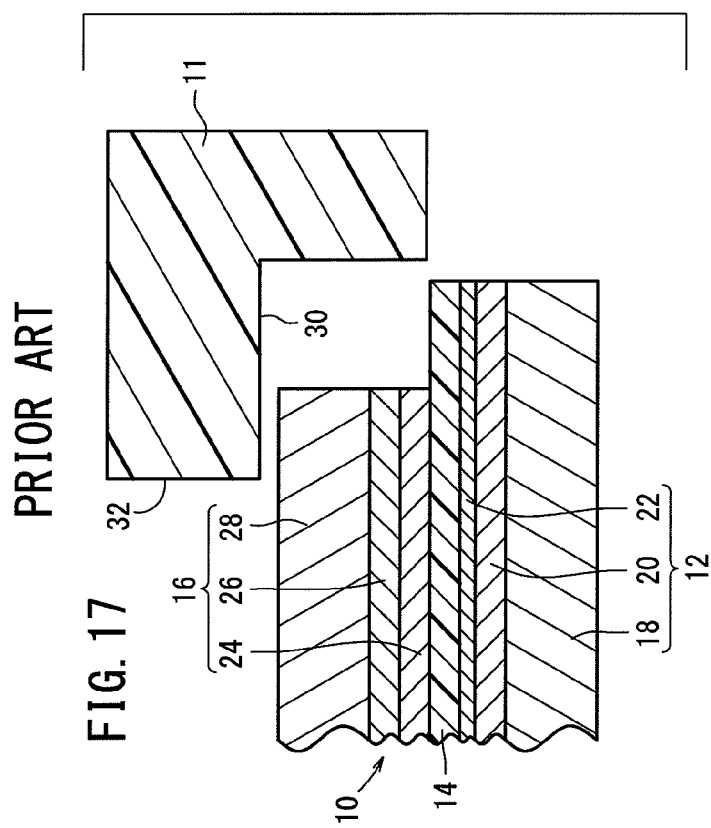
FIG. 17 is a schematic vertical cross-sectional view of a resin frame, which is placed on an upper surface of an electrolyte membrane, according to a conventional technique for producing a fuel cell assembly.
Figure 18:
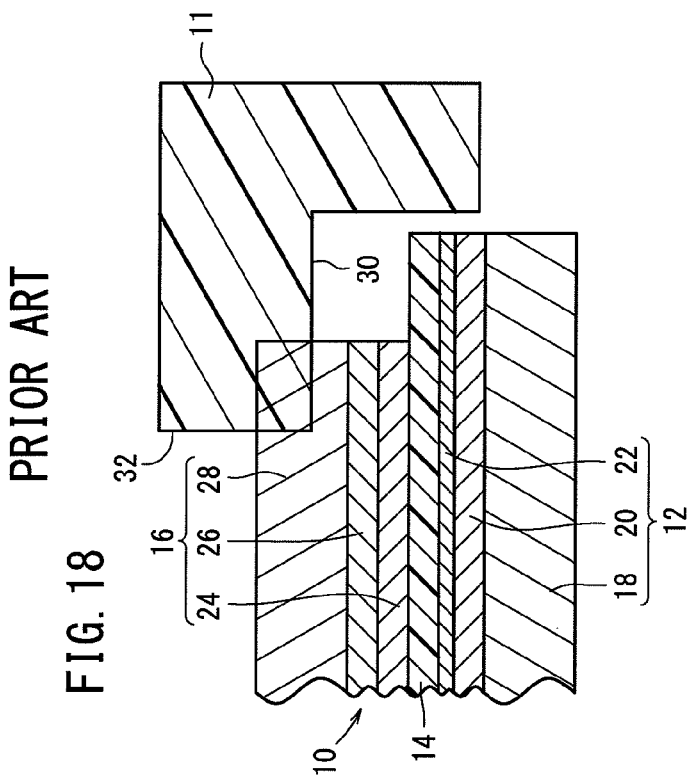
FIG. 18 is a schematic vertical cross-sectional view of the fuel cell assembly, which is produced by a method according to the conventional technique.

In the fuel cell assembly 50 of FIG. 1, as well as in that of FIG. 17, the membrane electrode assembly 10 contains a cathode 12 having a large width, an electrolyte membrane 14 having substantially the same width as the cathode 12, and an anode 16 having a width that is smaller than the widths of the cathode 12 and the electrolyte membrane 14. Therefore, edges of the upper surface of the electrolyte membrane 14 are exposed outside of the anode 16.

The cathode 12 contains a gas diffusion layer 18, an underlayer 20, and an electrode catalyst layer 22, which are stacked in this order from the bottom. The anode 16 contains an electrode catalyst layer 24, an underlayer 26, and a gas diffusion layer 28 made of carbon paper or the like, which are stacked in this order from the bottom.

The resin frame 52 serves to support the membrane electrode assembly 10 having the aforementioned structure, and has a recess 30 that extends from the lower surface toward the upper surface, as shown in FIG. 1. Furthermore, a housing hole 32 is formed as a through-hole that extends from the ceiling surface of the recess 30 to the upper surface.

As shown in FIG. 1, the cathode 12 and the electrolyte membrane 14 are placed in the recess 30, whereas the anode 16 is placed in the housing hole 32.

The material in the vicinity of the housing hole 32 penetrates into the gas diffusion layer 28 of the anode 16. Due to such penetration, the resin frame 52 is connected with the anode 16. Incidentally, portions of the material of the resin frame 52 that penetrate into the gas diffusion layer 28 are shown in cross-hatching in FIG. 1.

The ceiling surface of the recess 30 may be placed in contact only with the upper surface of the electrolyte membrane 14 facing the ceiling surface. Alternatively, the ceiling surface of the recess 30 may be bonded to the electrolyte membrane 14 through an adhesive or the like.

In any case, the electrolyte membrane 14 and the ceiling surface of the recess 30 are not heat-welded to each other. Therefore, heat denaturation of the electrolyte membrane 14 is prevented. Consequently, even if the electrolyte membrane 14 is subjected to swelling and shrinkage, the strength of the electrolyte membrane 14 is not deteriorated, and the electrolyte membrane 14 and the like are not damaged.

The height of the upper surface of the resin frame 52 is substantially equal to the height of the upper surface of the gas diffusion layer 28. Thus, upper surfaces of the resin frame 52 and the gas diffusion layer 28 are formed substantially in one plane.

Although not shown in the drawings, the resin frame 52 has a supply hole for supplying an oxygen-containing gas to the cathode 12, a discharge hole for discharging the oxidant gas from the cathode, a supply hole for supplying a fuel gas to the anode 16, a discharge hole for discharging the fuel gas from the anode, a supply hole for supplying a coolant to the unit cell, and a discharge hole for discharging the coolant from the unit cell.

When the fuel cell assembly 50 having such a basic structure is operated, or when a stack made up of a certain number of the fuel cell assemblies 50 is operated, the oxygen-containing gas and the fuel gas are supplied from the supply holes to the cathode 12 and the anode 16, respectively, and the residual gas and the reaction resultant gas are discharged from the discharge holes. Meanwhile, the coolant is supplied and discharged.

As described above, the ceiling surface of the recess 30 in the resin frame 52 is placed in contact with or is bonded to the exposed upper surface of the electrolyte membrane 14. Therefore, leakage of fuel gas from the anode 16 to the cathode 12, and leakage of oxygen-containing gas from the cathode 12 to the anode 16 are prevented. Thus, when the ceiling surface of the recess 30 in the resin frame 52 is placed in contact with or is bonded to the exposed upper surface of the electrolyte membrane 14, the fuel cell assembly 50 exhibits a sufficient sealing property.

Furthermore, upper surfaces of the resin frame 52 and the gas diffusion layer 28 are formed substantially in one plane. Therefore, the resin frame 52 does not protrude from the membrane electrode assembly 10. Thus, an increase in thickness of a stack, which is made up of the fuel cell assemblies 50, can be prevented.

The fuel cell assembly 50 having such a structure can be produced in the following manner.

Figure 2:
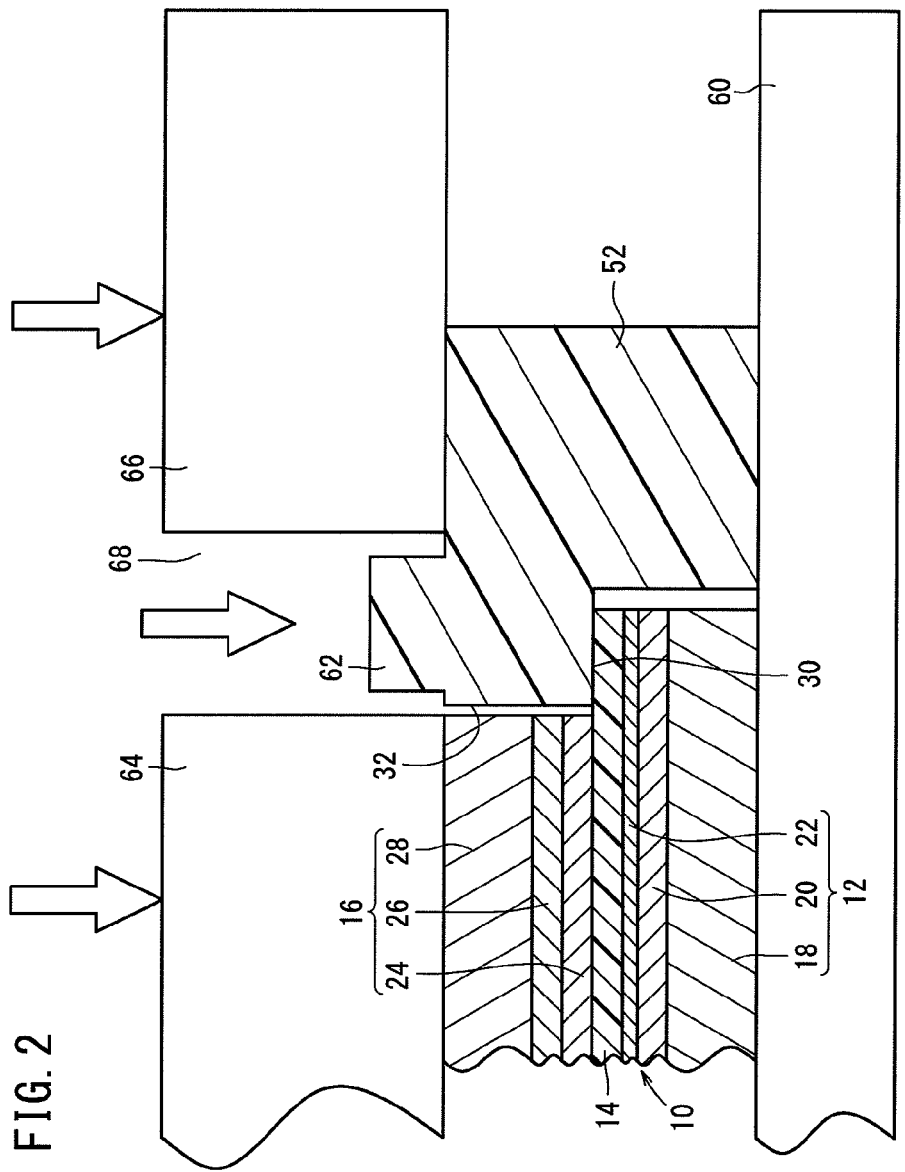
FIG. 2 is a schematic vertical cross-sectional view of a resin frame, which is placed on an upper surface of an electrolyte membrane in order to produce the fuel cell assembly of FIG. 1.

Initially, as shown in FIG. 2, the membrane electrode assembly 10 is placed on a heat radiating base 60. It will be understood that the heat radiating base 60 faces toward the gas diffusion layer 18 of the cathode 12.

Then, the resin frame 52 is placed on the electrolyte membrane 14 such that the ceiling surface of the recess 30 in the resin frame 52 is brought into contact with the exposed upper surface of the electrolyte membrane 14. During this step, it is not necessary for the side wall of the housing hole 32 to be brought into contact with the anode 16.

A protrusion 62 is formed beforehand on the upper surface of the resin frame 52 in the vicinity of the recess 30. The protrusion 62 may be molded integrally with the resin frame 52. Alternatively, the protrusion 62 may be formed by so-called padding in the vicinity of the recess 30. As will be described in the second embodiment, it is also preferred that a trap recess is formed in the vicinity of the protrusion 62.

A first heat radiating press mold 64 and a second heat radiating press mold 66 are placed respectively on the gas diffusion layer 28 of the anode 16 and on the upper surface of the resin frame 52. A clearance 68 is formed between the first heat radiating press mold 64 and the second heat radiating press mold 66. The protrusion 62 is located in the clearance 68.

Next, the protrusion 62 is heated and pressed. During this step, for example, laser irradiation, infrared ray irradiation, or the like may be carried out. Alternatively, a heated jig such as a hot plate may be pressed directly against the protrusion 62.

A load, which corresponds to the fastening pressure of a stack, which is made up of the fuel cell assemblies 50, preferably is applied in the pressing step. In this case, the resin frame 52 and the membrane electrode assembly 10 are pressed under a load which is substantially equal to the fastening pressure of the stack. Thus, the fuel cell assembly 50 can have a thickness substantially equivalent to the size in the thickness-direction of the stack. Consequently, an advantage exists in that a gap is not formed between the upper surface of the electrolyte membrane 14 and the ceiling surface of the recess 30 in the resin frame 52, so that gas leakage can easily be prevented.

The protrusion 62 and a portion located immediately beneath the protrusion 62 in the vicinity of the recess 30 are softened and made flowable by heating. The softened material is moved as a result of being pressed. Since the second heat radiating press mold 66 is placed on the upper surface of the resin frame 52, the softened material does not flow significantly toward the second heat radiating press mold 66. Therefore, the softened material flows toward the anode 16.

Figure 3:
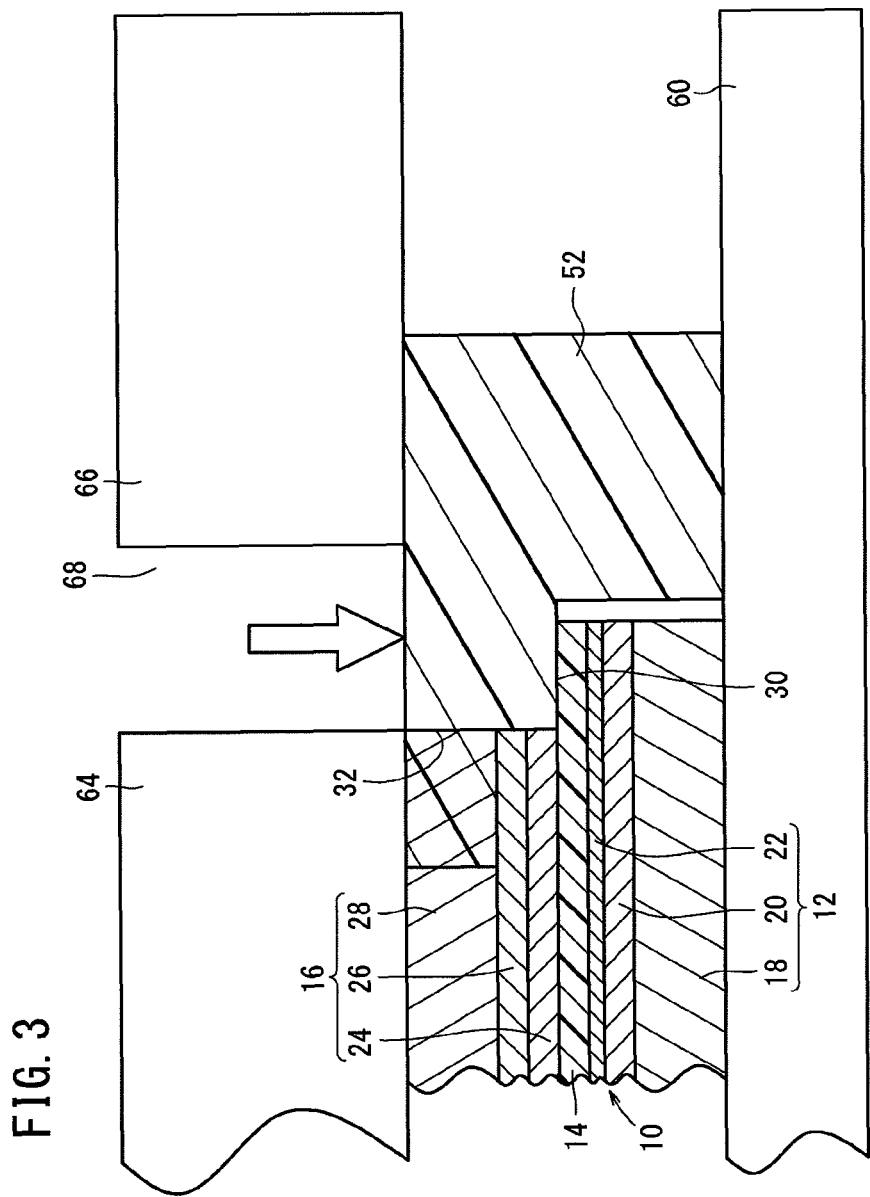
FIG. 3 is a schematic vertical cross-sectional view of the resin frame, which is heated and pressed following the step shown in FIG. 2.

The gas diffusion layer 28 is a porous body. Therefore, as shown in FIG. 3, the softened material penetrates into the gas diffusion layer 28. Thereafter, when heating is stopped, the softened material, which is introduced into the gas diffusion layer 28, is cooled and solidified. The gas diffusion layer 28 (anode 16) and the resin frame 52 are bonded integrally to each other in this manner.

In the above process, heat of the resin frame 52 is rapidly transferred to and released from the heat radiating base 60, the first heat radiating press mold 64, and the second heat radiating press mold 66. Therefore, heat is not retained in the resin frame 52, and portions other than the protrusion 62 and the portion located immediately beneath the protrusion 62 are not softened. In addition, the membrane electrode assembly 10 and the resin frame 52 are prevented from warping.

By carrying out the aforementioned steps, the fuel cell assembly 50 shown in FIG. 1 is produced.

Figure 4:
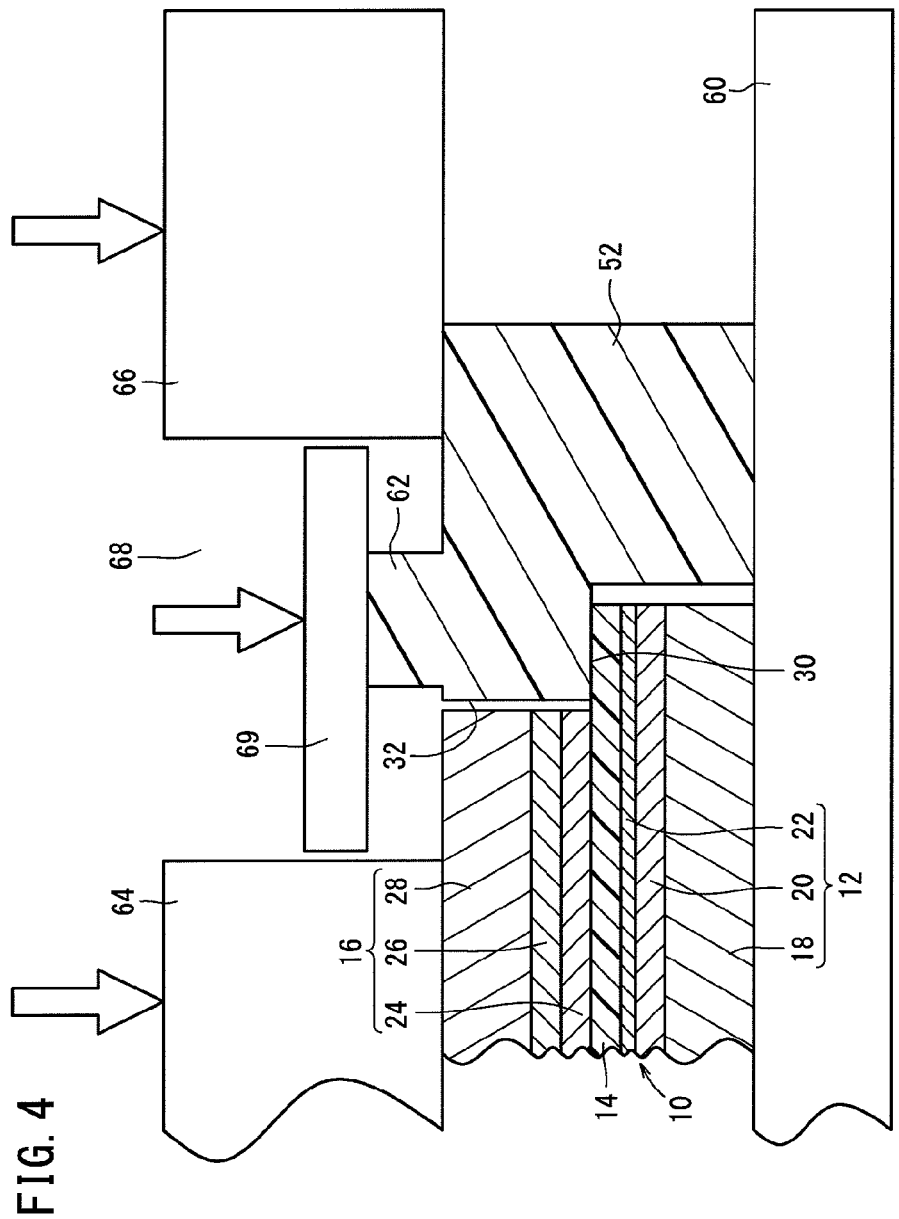
FIG. 4 is a schematic vertical cross-sectional view of the resin frame, which is pressed by a pressing jig.

For heating and pressing the protrusion 62, a pressing jig 69 may be used, as shown in FIG. 4. In the case that the protrusion 62 is heated by irradiation or through use of a hot plate, the pressing jig 69 may be constituted by a heat transfer member, which is composed of a metal such as iron or copper. In the case that the protrusion 62 is heated by laser irradiation or infrared ray irradiation, the pressing jig 69 may be composed of an electromagnetic wave transmitting material such as glass. In any of such cases, the area of the pressing surface of the pressing jig 69 preferably is greater than the area of the upper end of the protrusion 62.

Figure 5:
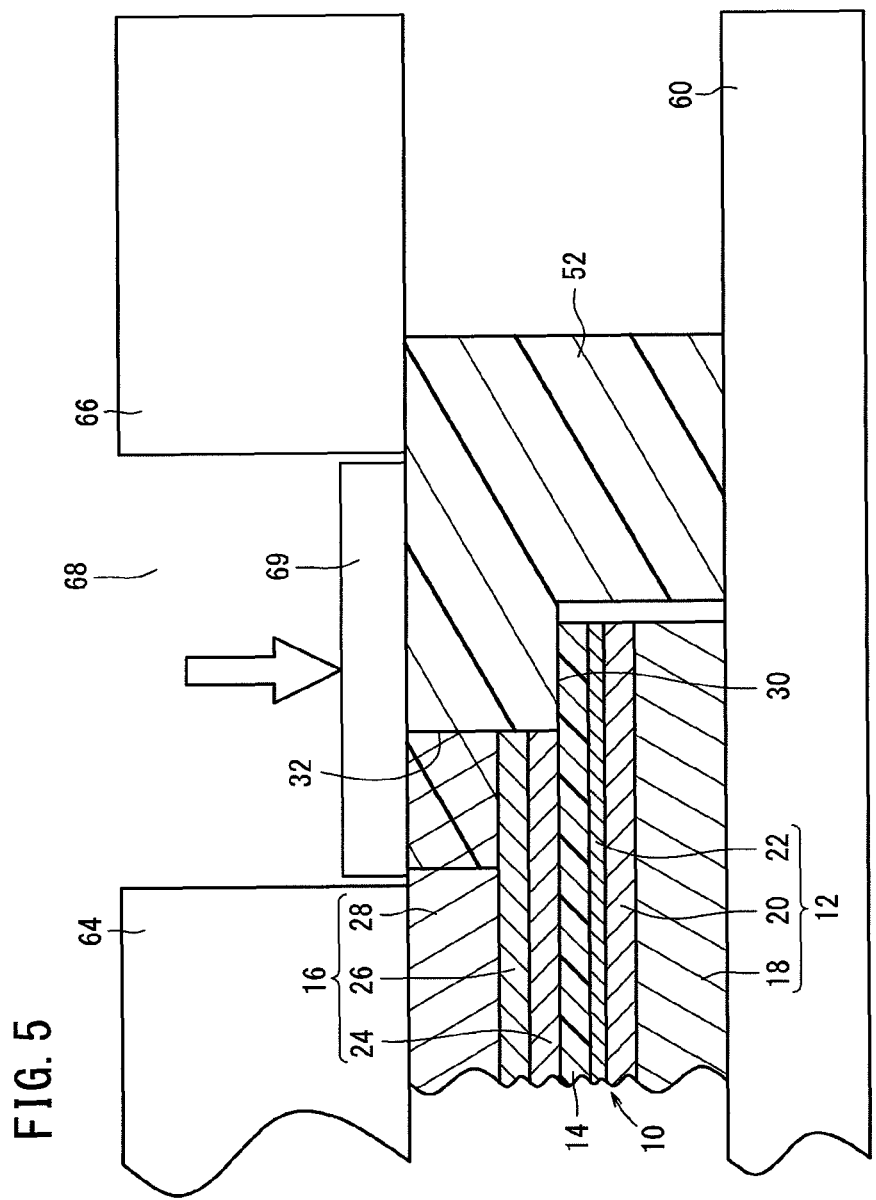
FIG. 5 is a schematic vertical cross-sectional view of a melt of the resin frame, which is shown in a state of penetrating into a gas diffusion layer of an anode following the step shown in FIG. 4.

In such cases as well, as described above, the protrusion 62 is heated and pressed, such that the softened material is generated and penetrates into the gas diffusion layer 28, as shown in FIG. 5. At this time, if the area of the pressing surface of the pressing jig 69 is greater than the area of the upper end of the protrusion 62, the softened material can effectively be prevented from penetrating between the pressing jig 69 and the first heat radiating press mold 64, or between the pressing jig 69 and the second heat radiating press mold 66.

When the pressing surface of the pressing jig 69 (the contact surface, which is in contact with the protrusion 62) is lowered, such that the height position of the pressing surface is substantially equal to that of the lower surface of the second heat radiating press mold 66 (the contact surface, which is in contact with the resin frame 52), a load (reaction force) that acts on the resin frame 52 is detected, and lowering is stopped together with stopping heating. Together therewith, the softened material that was introduced into the gas diffusion layer 28 is cooled and solidified, whereby the gas diffusion layer 28 (anode 16) and the resin frame 52 are bonded integrally to each other. Since, as described above, the softened material is prevented from penetrating between the pressing jig 69 and the first heat radiating press mold 64, or between the pressing jig 69 and the second heat radiating press mold 66, generation of burrs is prevented. In addition, after heating is stopped, the pressing jig 69 may be kept in the lowered stop position until the softened material is cooled and solidified. In this case as well, the so-called stringing effect is prevented.

Figure 6:
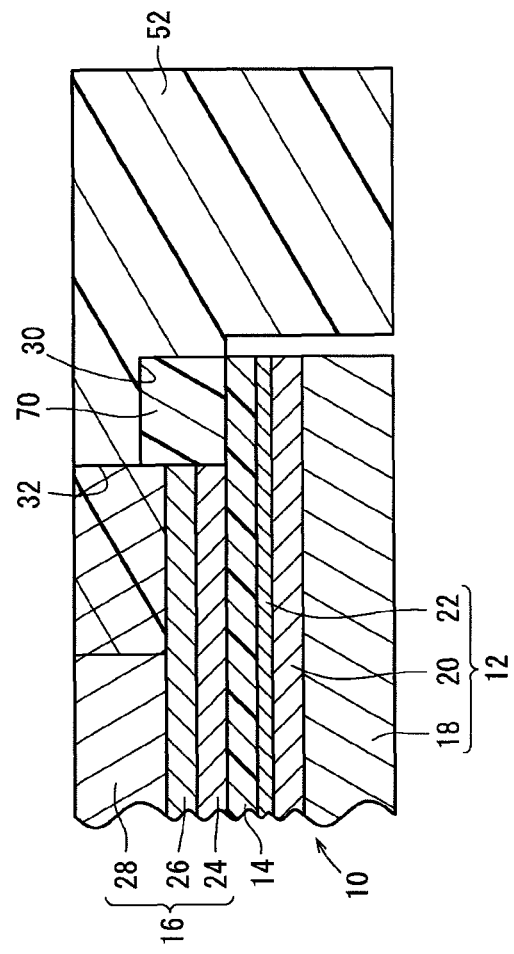
FIG. 6 is a schematic vertical cross-sectional view of an elastomer that is interposed between the electrolyte membrane and the resin frame in the fuel cell assembly.

As shown in FIG. 6, an elastomer 70 may be interposed between the upper surface of the electrolyte membrane 14 and the ceiling surface of the recess 30 in the resin frame 52. In this case, the elastomer 70 is held in contact with both the upper surface of the electrolyte membrane 14 and the ceiling surface of the recess 30 in the resin frame 52, such that a gap therebetween is filled with the elastomer 70. Accordingly, in this case, the fuel cell assembly 50 exhibits a further improved sealing property.

The elastomer 70 may be placed on the exposed upper surface of the electrolyte membrane 14 before the resin frame 52 is placed on the electrolyte membrane 14. The elastomer 70 possesses excellent elasticity, and therefore during the above heating and pressing step, the elastomer 70 is readily expanded. Thus, flowage of the softened material from the protrusion 62 and from the portion in the vicinity of the recess 30 is not inhibited by the elastomer 70.

Figure 7:
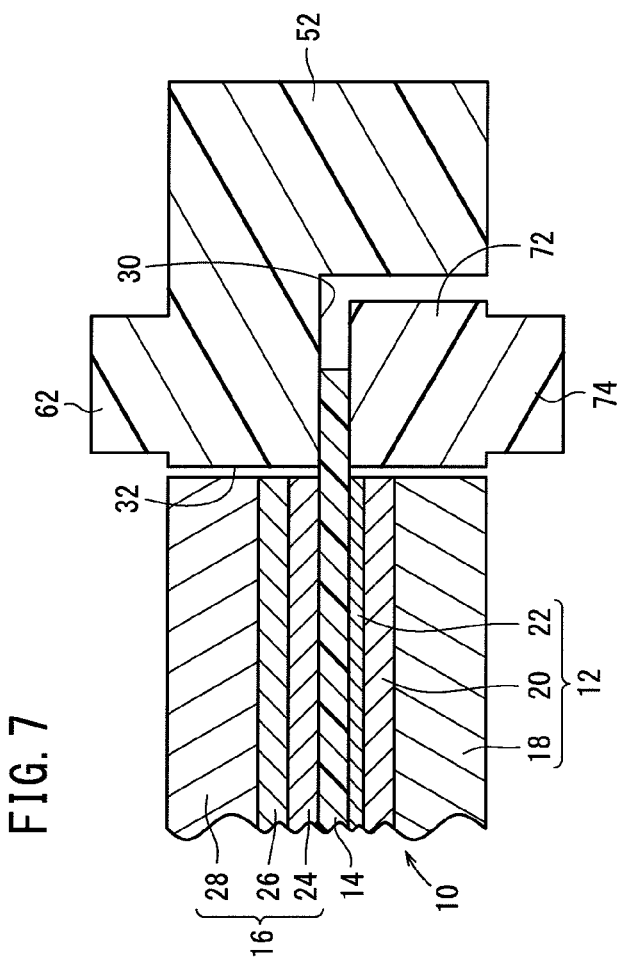
FIG. 7 is a schematic vertical cross-sectional view of the electrolyte membrane, in which both lower and upper surfaces thereof are bonded to resin frames.

As shown in FIG. 7, the lower surface of the electrolyte membrane 14 is exposed outside of the cathode 12, and the exposed lower surface may be bonded to another resin frame 72. Such a modified example will be described below.

In the modified example, the other resin frame 72, which is substantially rectangular in shape, is inserted into the recess 30 in the resin frame 52. The other resin frame 72 has a protrusion 74, which extends downwardly in FIG. 7. A portion immediately above the protrusion 74 is brought into contact with a lower surface of the electrolyte membrane 14, which is exposed outside of the cathode 12.

The two protrusions 62, 74 are both simultaneously pressed and heated by an impulse heating method, for example. Accordingly, as described above, the protrusion 62 and the portion located immediately beneath the protrusion 62 are softened so as to penetrate into the gas diffusion layer 28 of the anode 16. Meanwhile, the protrusion 74 and the portion located immediately above the protrusion 74 are softened so as to penetrate into the gas diffusion layer 18 of the cathode 12.

Thereafter, when heating is stopped, the softened material introduced into the gas diffusion layer 18 is cooled and solidified. In the thus-obtained product of the fuel cell assembly 50, the resin frame 52 and the gas diffusion layer 28 of the anode 16 are integrally bonded to each other, and the other resin frame 72 and the gas diffusion layer 18 of the cathode 12 are integrally bonded to each other. Incidentally, the lower surfaces of the other resin frame 72 and the gas diffusion layer 18 are formed substantially in one plane.

Next, a joined assembly production method and an apparatus for carrying out the method will be described below as a second embodiment. According to the second embodiment, a fuel cell assembly is used as an example of the joined assembly. Incidentally, in the drawings of the second embodiment as well as in FIGS. 1 to 7, 17, and 18, the same constituent elements are marked with the same reference numerals, and detailed explanations of such features are omitted.

Figure 8:
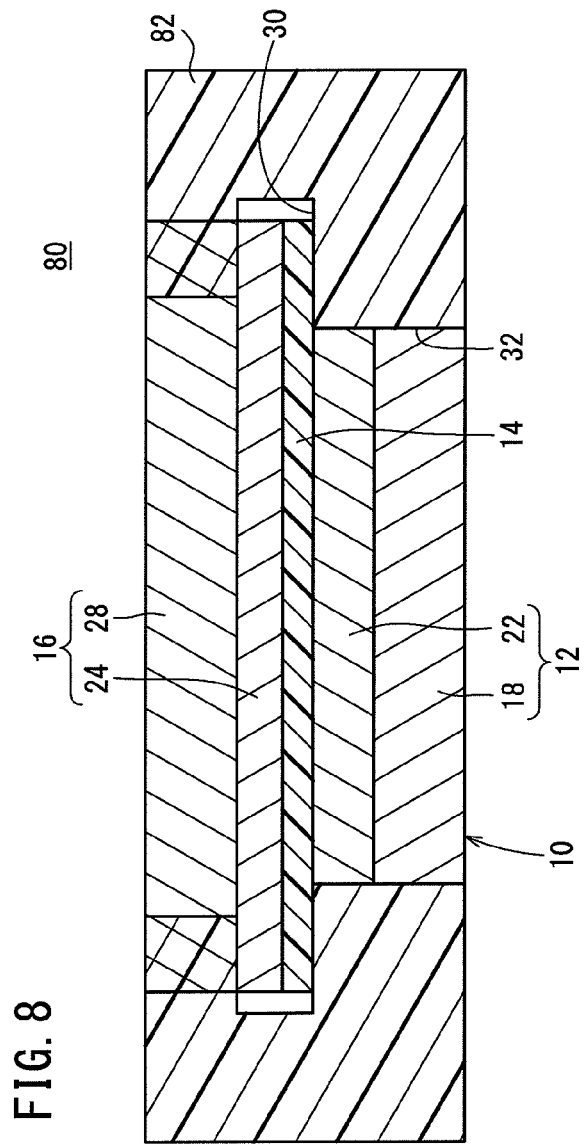
FIG. 8 is an overall schematic vertical cross-sectional view of a fuel cell assembly, which is produced using a bonding apparatus according to a second embodiment of the present invention.

FIG. 8 is an overall schematic vertical cross-sectional view of a fuel cell assembly 80, which makes up the joined assembly. The fuel cell assembly 80 contains a membrane electrode assembly 10, and a resin frame 82 for supporting the membrane electrode assembly 10.

In the fuel cell assembly 80, the membrane electrode assembly 10 contains a cathode 12 having a small width, an electrolyte membrane 14 having a width that is greater than the width of the cathode 12, and an anode 16 having substantially the same width as the electrolyte membrane 14. Therefore, edges of the lower surface of the electrolyte membrane 14 are exposed outside of the cathode 12.

The cathode 12 contains a gas diffusion layer 18 and an electrode catalyst layer 22, which are stacked in this order from the bottom. The anode 16 contains an electrode catalyst layer 24 and a gas diffusion layer 28, which are stacked in this order from the bottom.

As shown in FIG. 8, the resin frame 82 has a recess 30 that extends from the upper surface toward the lower surface. Furthermore, a housing hole 32 is formed as a through-hole that extends from the bottom surface of the recess 30 to the lower surface. Thus, the recess 30 extends from the upper surface toward the lower surface of the resin frame 82, and the housing hole 32 opens on the bottom surface of the recess 30.

As shown in FIG. 8, in the fuel cell assembly 80, the cathode 12 is placed in the housing hole 32, and the electrolyte membrane 14 and the anode 16 are placed in the recess 30.

The material of the recess 30 penetrates into the gas diffusion layer 28 of the anode 16 in the vicinity of the opening. As a result of such penetration, the resin frame 82 becomes connected with the anode 16. Incidentally, in FIG. 8, in portions thereof shown in cross-hatching, the material of the resin frame 82 penetrates into the gas diffusion layer 28.

Similar to the first embodiment, the bottom surface of the recess 30 may be placed in contact solely with the lower surface of the electrolyte membrane 14 in facing relation to the bottom surface, and may be bonded to the electrolyte membrane 14 by an adhesive or the like.

A bonding apparatus for producing the fuel cell assembly 80 will be described with reference to FIGS. 9 to 16. The fuel cell assembly 50 of the first embodiment can also be produced by the bonding apparatus.

Figure 9:
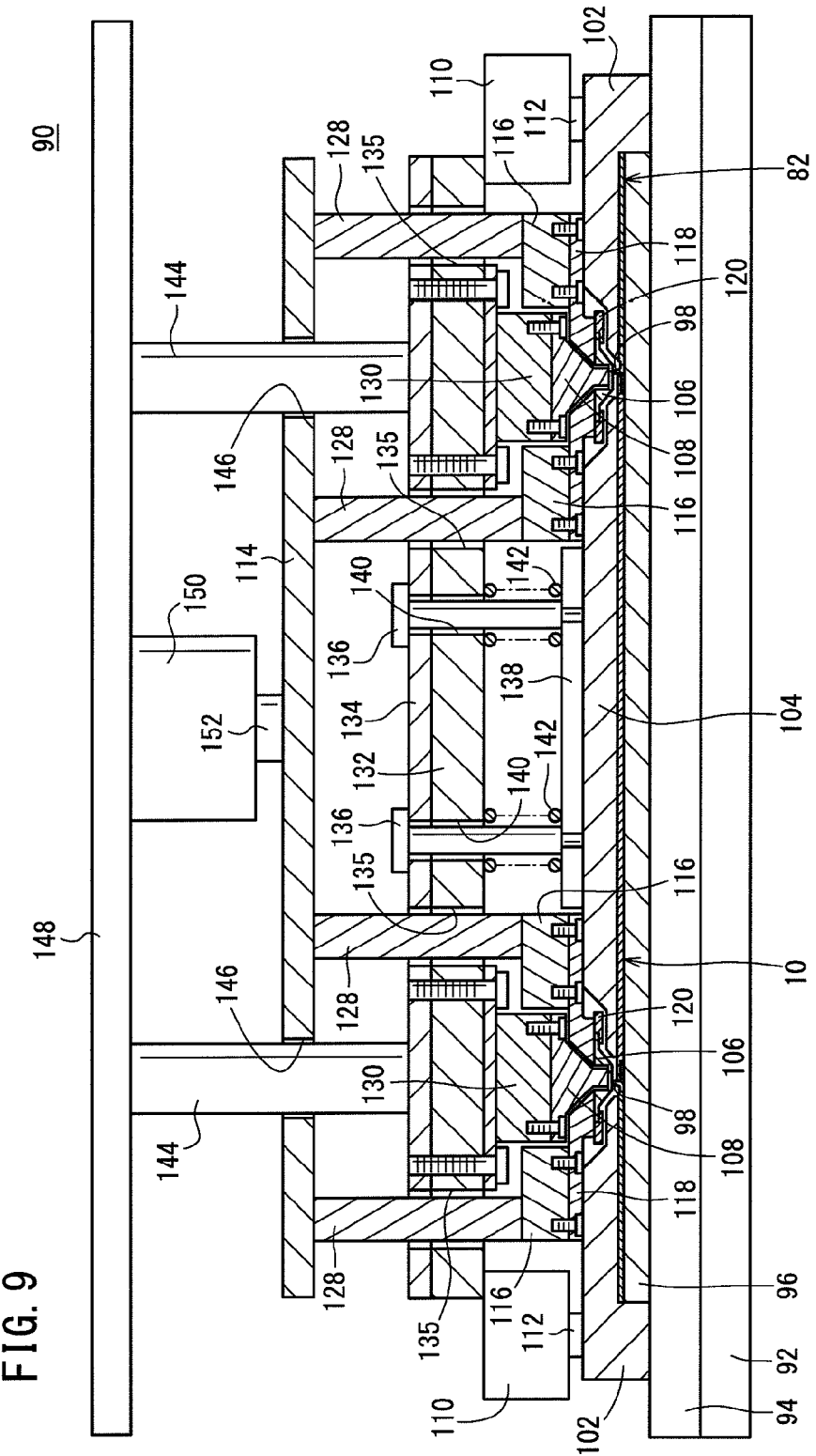
FIG. 9 is a schematic partially vertical cross-sectional front view of the bonding apparatus.

FIG. 9 is a schematic partially vertical cross-sectional front view of a bonding apparatus 90 according to the second embodiment. Hereinafter, the terms "bottom", "top", "left", and "right" will be used to imply the bottom, top, left, and right of the drawings, respectively.

The bonding apparatus 90 includes a first die base 92, a second die base 94, and a positioning jig 96. The membrane electrode assembly 10 and the resin frame 82 are placed on the positioning jig 96. At this time, the outer periphery of the membrane electrode assembly 10 is surrounded by the inner periphery of the resin frame 82. A protrusion 98 (see FIG. 10) is formed convexly on the upper surface of the resin frame 82, and a trap recess 100 is formed in a concave manner in the vicinity of the protrusion 98. The volume of the trap recess 100 is slightly smaller than the volume of the protrusion 98.

A first coolant passage (not shown) is formed in the positioning jig 96. A coolant is supplied to the first coolant passage in order to accelerate cooling and hardening of the softened or melted resin frame 82.

The bonding apparatus 90 (see FIG. 9) further includes a frame pushing member 102 for pressing the upper surface of the resin frame 82, a structure pushing member 104 for pressing the upper surface of the membrane electrode assembly 10, and a pressing member 106 and a heating member 108 for pressing and heating the membrane electrode assembly 10 and the resin frame 82. The frame pushing member 102 is shaped in the form of a frame that surrounds the resin frame 82.

The frame pushing member 102 is connected with a first rod 112 of a first cylinder 110. Therefore, when the first rod 112 is moved forward (lowered) or moved backward (raised), the frame pushing member 102 is lowered or raised together with the first rod 112. The first cylinder 110 is supported by a non-illustrated support frame.

The structure pushing member 104 is substantially quadrangular in shape, and is disposed inside of the frame pushing member 102 such that the structure pushing member 104 is surrounded by the frame pushing member 102. A clearance is formed between the structure pushing member 104 and the frame pushing member 102. A facing portion is exposed in the clearance. The outer peripheral end surface of the membrane electrode assembly 10 and the inner peripheral end surface of the resin frame 82 are arranged in facing relation to each other in the facing portion.

The structure pushing member 104 and the heating member 108 are supported by a first support board 114. The manner of support thereof will be described in detail hereinafter.

Figure 10:
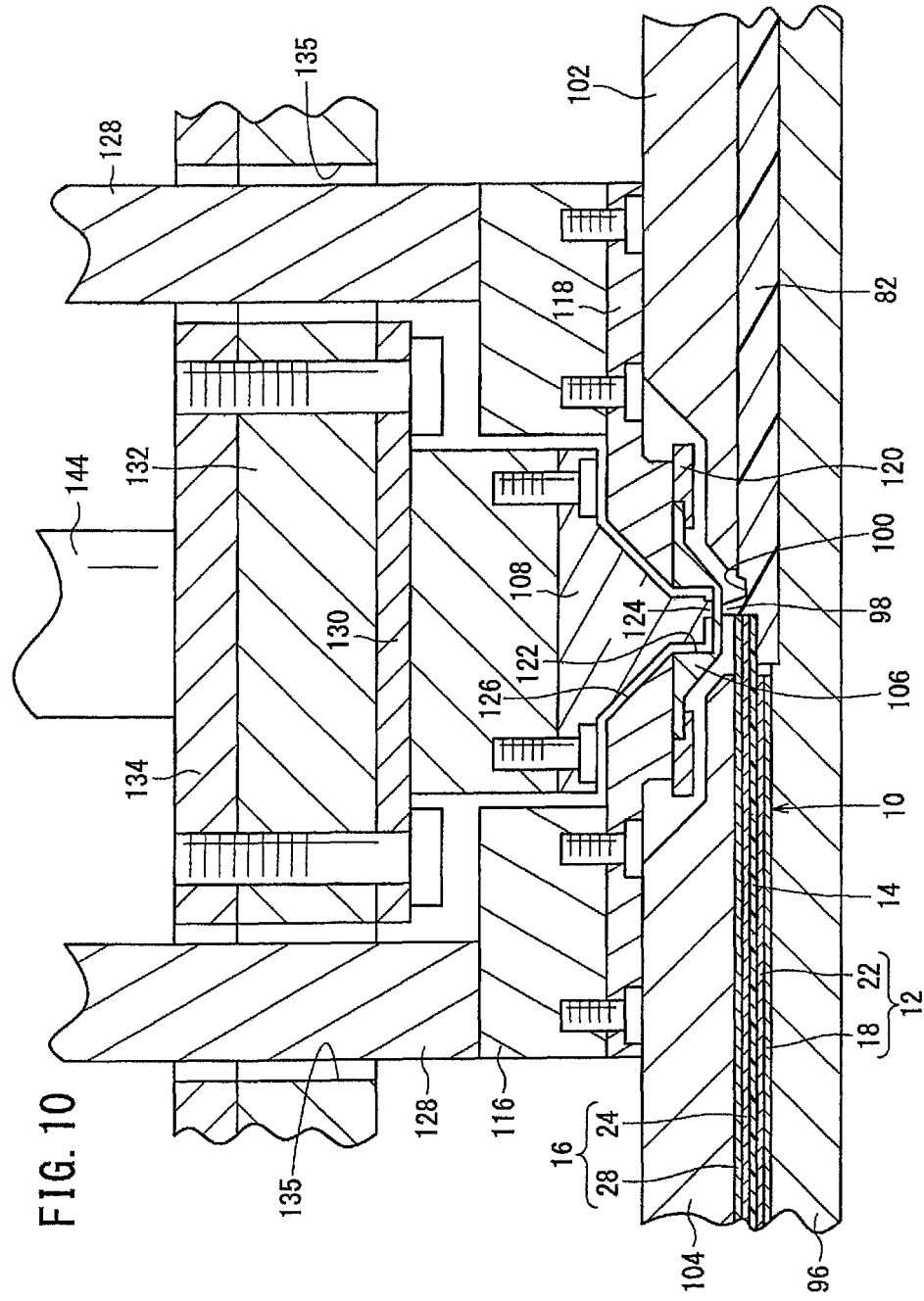
FIG. 10 is an enlarged view of a principal part shown in FIG. 9.
Figure 11:
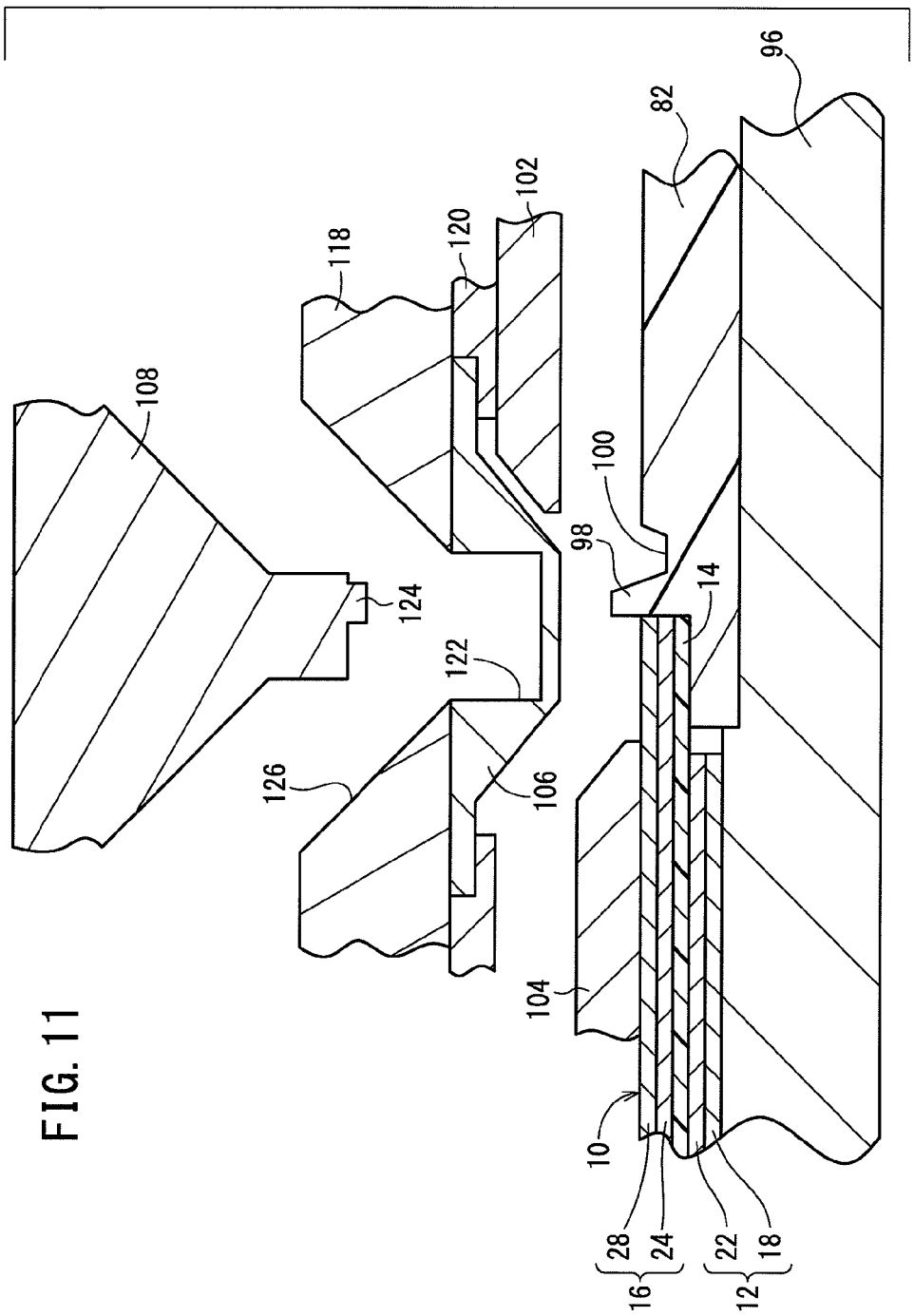
FIG. 11 is a schematic front view of a pressing member and a heating member, which are separated away from each other and lowered in this state in order to bond a porous member and a resin member.

FIG. 10 is an enlarged view of a principal part of the pressing member 106 and the heating member 108, as shown on the right-hand side of FIG. 9. As shown in FIG. 10, the pressing member 106 is used in order to convexly press the protrusion 98, which is formed in the vicinity of the opening of the recess 30 in the resin frame 82. The heating member 108 is used for heating and softening the protrusion 98. The pressing member 106 and the heating member 108 each are formed in the shape of a frame along the protrusion 98 of the resin frame 82.

The pressing member 106 is sandwiched between a cooling conduction block 118, which is connected to a cooling block 116, and a pushing plate 120, which is connected to the cooling conduction block 118. An insert recess 122, into which a tapered lower end of the heating member 108 can be introduced, is formed in a concave shape on the pressing member 106. When the lower end of the heating member 108 is introduced into the insert recess 122, a projection 124 at the lower end is brought into contact with the bottom surface of the insert recess 122. The projection 124 is disposed in facing relation to the protrusion 98 on the bottom surface of the insert recess 122.

A tapered through-hole 126, which is connected to the insert recess 122, is formed in the cooling conduction block 118. The projection 124 of the heating member 108 is introduced through the tapered through-hole 126 into the insert recess 122.

A second coolant passage (not shown) is formed in the cooling block 116. The coolant is supplied to the first and second coolant passages in order to draw heat from the cooling block 116, the cooling conduction block 118, and the pressing member 106. Upon separation of the heating member 108 from the pressing member 106, the temperature of the pressing member 106 is rapidly lowered. Thus, cooling and hardening of the softened or melted resin frame 82 is further accelerated.

As shown in FIG. 9, the cooling block 116 is connected to the first support board 114 by a first columnar member 128, and thus, the cooling block 116 is supported by the first support board 114. Because in the foregoing manner the pressing member 106 is sandwiched between the cooling conduction block 118 and the pushing plate 120, and is supported by the cooling block 116, as a result, the pressing member 106 is supported by the first support board 114. Thus, when the first support board 114 is raised or lowered, the first columnar member 128, the cooling block 116, the cooling conduction block 118, and the pressing member 106 are raised or lowered in unison with the first support board 114.

The heating member 108 is connected to a heating block 130. A cartridge heater (not shown) is embedded in the heating block 130. The cartridge heater is energized so as to transfer heat to the heating block 130 and the heating member 108.

The heating member 108 is connected to a second support board 134 with a heat insulation board 132 interposed therebetween. Therefore, the heating member 108 is supported by the second support board 134. Due to the heat insulation board 132, which is interposed between the second support board 134 and the heating member 108, the second support board 134 is prevented from being raised in temperature excessively.

An insert hole 135 is formed in the heat insulation board 132 and the second support board 134. The first columnar member 128 extends through the insert hole 135 to the first support board 114.

A spring bearing board 138 is supported through a connecting bolt 136 on the second support board 134. In this manner, a screw hole is formed on the spring bearing board 138, and a distal end of the connecting bolt 136 is screwed into the screw hole.

A large-diameter hole 140 is formed in the second support board 134 and the heat insulation board 132. The body of the connecting bolt 136 is inserted into the large-diameter hole 140 with a certain allowance. Thus, the connecting bolt 136 is fixed only to the spring bearing board 138, and is not constricted by the second support board 134 and the heat insulation board 132. The head of the connecting bolt 136 has a diameter, which is greater than that of the large-diameter hole 140, such that the connecting bolt 136 cannot become separated from the large-diameter hole 140.

The body of the connecting bolt 136 is inserted into a coil spring 142, which is disposed between the spring bearing board 138 and the heat insulation board 132. Furthermore, the structure pushing member 104 is connected to the spring bearing board 138. Therefore, a spring force of the coil spring 142 acts on the structure pushing member 104.

A second columnar member 144 is disposed in an upstanding manner on the upper surface of the second support board 134. The second columnar member 144 is inserted into an insert hole 146, which is formed on the first support board 114, and is connected to a pressing machine mounting board 148. Therefore, the heating member 108 is supported by the pressing machine mounting board 148. Consequently, when the pressing machine mounting board 148 is raised or lowered, the second columnar member 144, the second support board 134, the heat insulation board 132, the heating block 130, and the heating member 108 are raised or lowered in unison with the pressing machine mounting board 148.

A second cylinder 150 (first displacement mechanism) is disposed on the lower surface of the pressing machine mounting board 148. A second rod 152 of the second cylinder 150 is connected to the upper surface of the first support board 114. Therefore, when the second rod 152 is moved forward (lowered) or moved backward (raised), the first support board 114, the cooling block 116, and the pressing member 106 are lowered or raised in follow-on relation thereto. Thus, as will be described hereinafter, the pressing member 106 is moved closer to or farther away from the protrusion 98.

A non-illustrated pressing machine (second displacement mechanism) is disposed on the upper surface of the pressing machine mounting board 148. The pressing machine mounting board 148 is lowered or raised by the pressing machine, whereby the heating member 108 is moved closer to or farther away from the facing portion.

A load sensor (not shown) is attached to the pressing machine. When a contact load is detected by the load sensor, a signal of the load is sent from the load sensor to a non-illustrated control circuit. When the control circuit receives the signal, the pressing member 106 is judged to be in contact with the resin frame 82.

The bonding apparatus 90 is constructed basically as described above. Advantageous effects of the bonding apparatus 90 will be described below in relation to a method for producing a joined assembly (the fuel cell assembly 80) according to the present embodiment.

Initially, as has been described above, the membrane electrode assembly 10 and the resin frame 82 are placed on the positioning jig 96. During this step, a lower surface edge of the electrolyte membrane 14, which is exposed outside of the cathode 12, is positioned on the bottom surface of the recess 30 of the resin frame 82. The bottom surface of the recess 30 may be bonded by an adhesive to the lower surface edge of the electrolyte membrane 14. The outer periphery of the membrane electrode assembly 10 is surrounded by the resin frame 82, and the outer peripheral end surface of the membrane electrode assembly 10 and the inner peripheral end surface of the resin frame 82 are arranged in facing relation to each other in the facing portion.

In this condition, the first cylinder 110 is driven, and the first rod 112 is moved forward to lower the frame pushing member 102. As a result, the resin frame 82 is pressed by the frame pushing member 102 in order to prevent displacement of the resin frame 82.

Next, the coolant, which may be water or oil, is introduced into the first and second coolant passages. Then, the cartridge heater is energized.

On the other hand, the pressing machine is operated in order to lower the pressing machine mounting board 148, and the first support board 114 and the second support board 134 are lowered in follow-on relation thereto. Thus, the structure pushing member 104, the heating member 108, the heating block 130, the cooling block 116, the cooling conduction block 118, and the pressing member 106 are lowered and displaced in close proximity to the facing portion. During this step, the second rod 152 of the second cylinder 150 is moved forward maximally. The pressing member 106 and the heating member 108 are lowered to the state shown in FIG. 11, where the pressing member 106 and the heating member 108 are separated mutually from each other.

Figure 12:
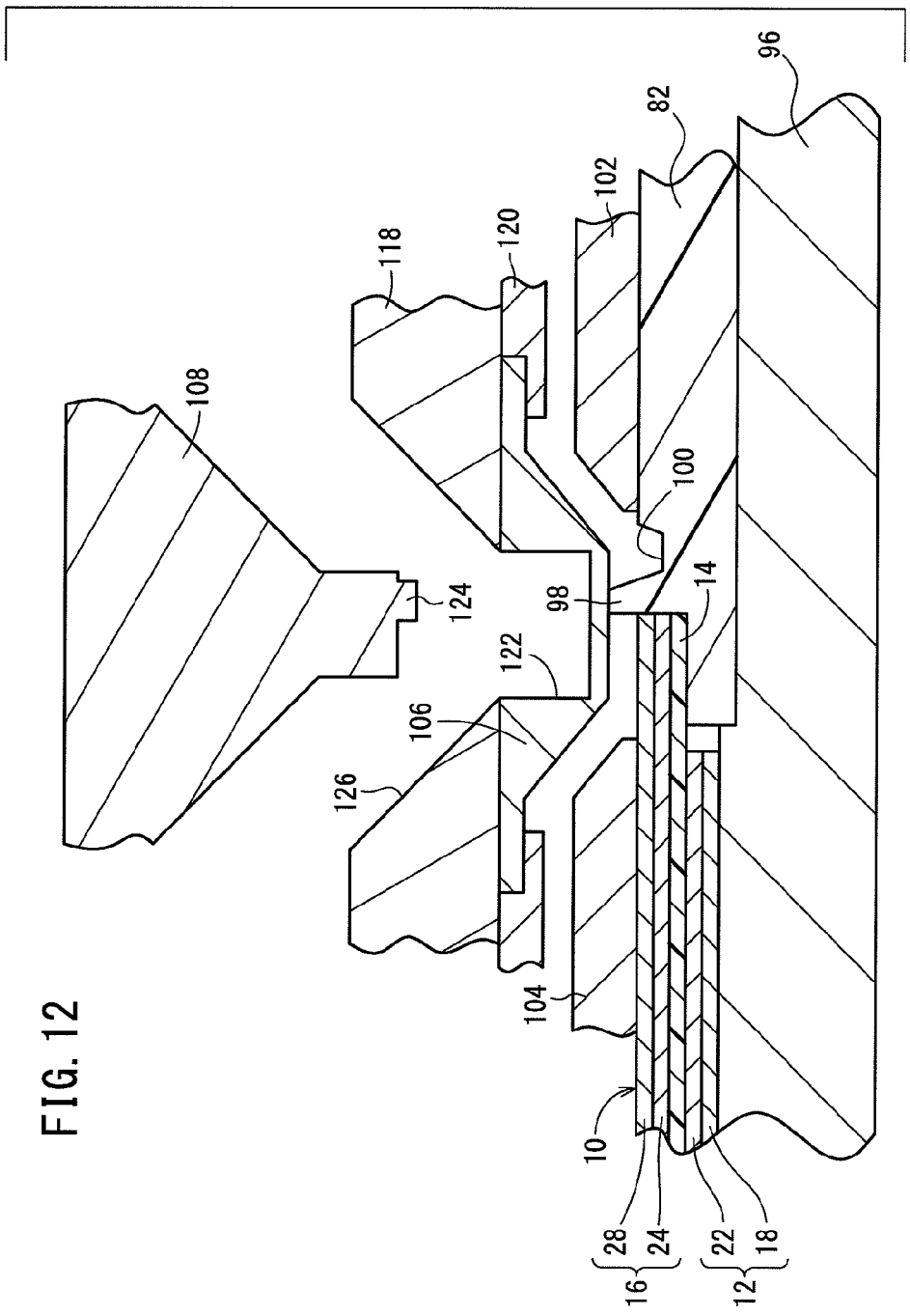
FIG. 12 is a schematic front view of the pressing member, which is brought into contact with a protrusion following the step shown in FIG. 11.

The pressing member 106 and the heating member 108 are lowered at the same speed. Therefore, as shown in FIG. 12, the pressing member 106 is brought into contact with the protrusion 98 before the heating member 108 is brought into contact with the pressing member 106. After contact therebetween, the second rod 152 of the second cylinder 150 begins to move backward, such that the pressure of the pressing member 106 that acts on the protrusion 98 is made constant. In other words, the second rod 152 is subjected to shrinkage.

On the other hand, the pressing machine mounting board 148 is lowered continuously by the pressing machine. The speed at which the pressing machine mounting board 148 is lowered and the speed at which the second rod 152 is moved backward are substantially the same. Therefore, the cooling block 116, the cooling conduction block 118, and the pressing member 106 are apparently stopped, whereas the structure pushing member 104, the heating block 130, and the heating member 108 are lowered continuously.

As a result, the structure pushing member 104 is placed on the upper surface of the membrane electrode assembly 10 (upper surface of the gas diffusion layer 28). Consequently, a clearance is formed between the outer edge of the structure pushing member 104 and the inner edge of the frame pushing member 102, and the facing portion is exposed in the clearance.

Figure 13:
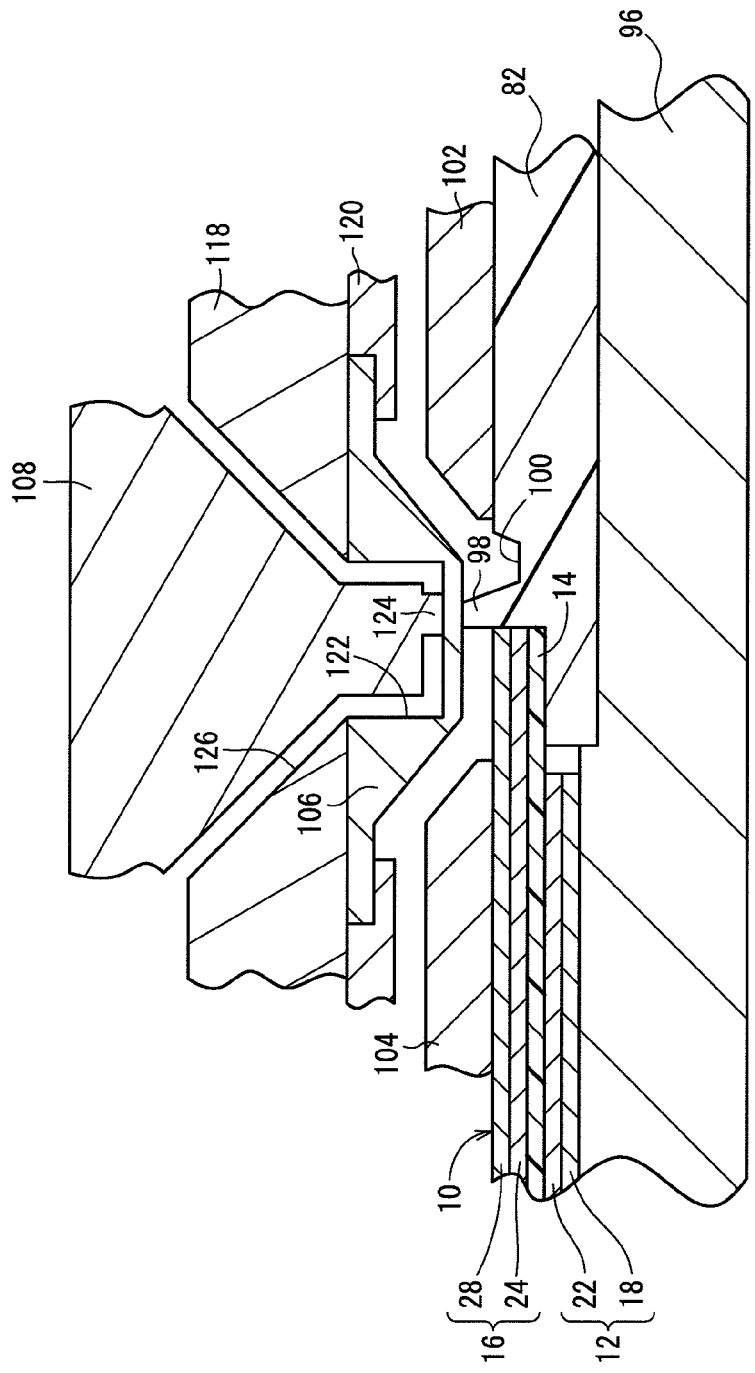
FIG. 13 is a schematic front view of an end of the heating member, which is brought into contact with the pressing member following the step shown in FIG. 12.

Substantially simultaneously with placement of the structure pushing member 104, as shown in FIG. 13, the lower end of the heating member 108 is inserted through the tapered through-hole 126 of the cooling conduction block 118 into the insert recess 122 of the pressing member 106, such that the projection 124 of the heating member 108 is brought into contact with the bottom surface of the insert recess 122. During this step, the reaction force of the protrusion 98 is greater than the pressing force of the pressing machine, and thus the heating member 108 is stopped temporarily.

Due to driving of the cartridge heater in the heating block 130, heat is transferred from the cartridge heater to the heating block 130. Heat from the heating block 130 is then transferred to the heating member 108, and further is transferred to the pressing member 106. Such heat transfer occurs due to the fact that the projection 124 of the heating member 108 is held in contact with the bottom surface of the insert recess 122 that is formed in the pressing member 106.

Consequently, heat is transferred to the protrusion 98 on which the heating member 108 is stacked with the pressing member 106 interposed therebetween. As a result, the protrusion 98 is heated, softened, and made flowable, so as to generate the softened material. It should be noted that the protrusion 98 may be melted by heating. In this description, the term "softened material" includes the meaning of a melted material.

Although the coolant is circulated in the second coolant passage of the cooling block 116, the amount of generated heat in the cartridge heater is controlled, such that the protrusion 98 can be softened even after heat exchange with the coolant has taken place. Thus, softening of the protrusion 98 is not inhibited.

Figure 14:
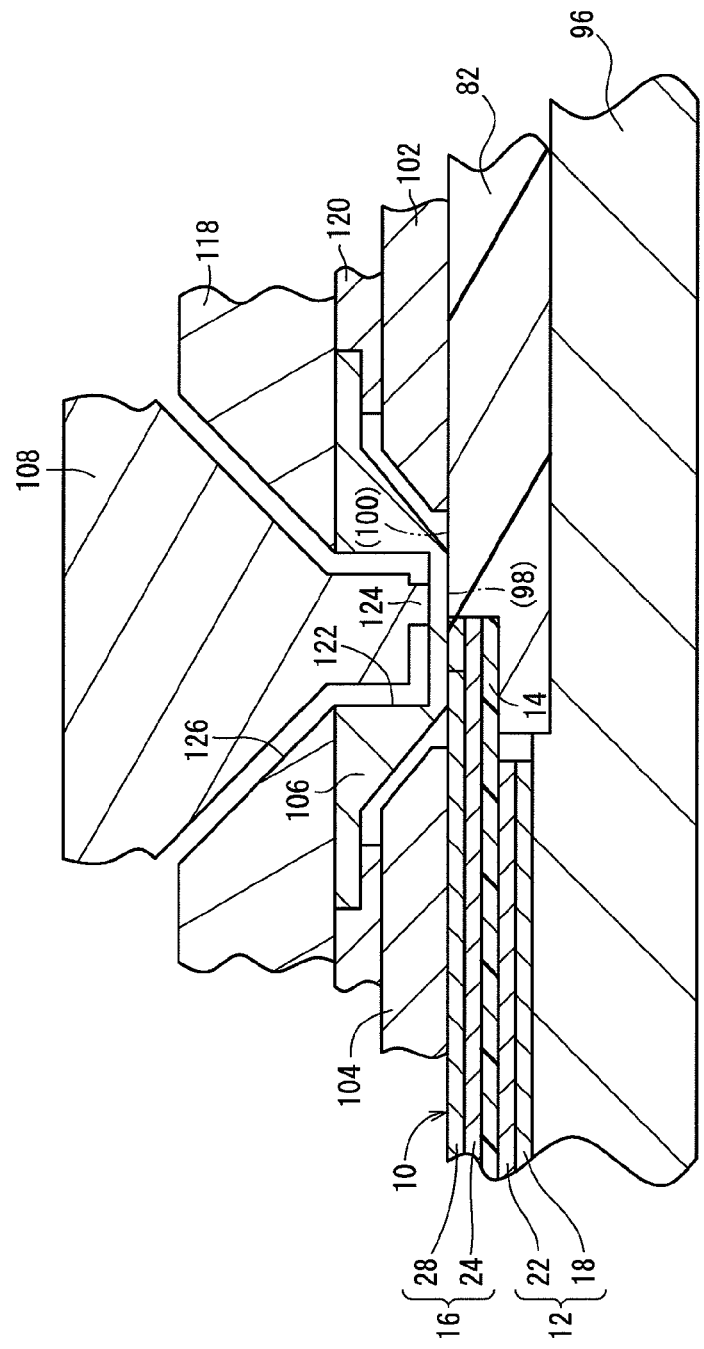
FIG. 14 is a schematic front view of the pressing member and the heating member, which are lowered further to crush the protrusion following the step shown in FIG. 13.

When the protrusion 98 is softened and the softened material is generated, the pressing force of the pressing machine becomes greater than the reaction force of the protrusion 98. Therefore, as shown in FIG. 14, the pressing member 106 and the heating member 108 are lowered further, whereupon the softened material is pressed by the pressing member 106. Consequently, the protrusion 98 is crushed, and the upper surfaces of the membrane electrode assembly 10 and the resin frame 82 are made to form a single plane in the facing portion, such that the pressing member 106 is held in contact with the upper surfaces.

During this step, the second support board 134 and the heat insulation board 132 are lowered slightly so as to become separated from the lower surface of the head of the connecting bolt 136. Furthermore, as a result of such lowering, the coil spring 142 is compressed.

When the pressing member 106 is brought into contact with the upper surfaces in the facing portion, the contact load is detected by the load sensor. A signal of the contact load is sent from the load sensor to the control circuit, and the pressing machine is stopped by the control circuit, and thus lowering of the pressing machine mounting board 148 is stopped. Consequently, backward movement of the second rod 152 is stopped as well.

The softened material is made to flow under the aforementioned pressure. In the present embodiment, the trap recess 100 is formed in the vicinity of the protrusion 98. Therefore, in the case that the softened material flows toward the frame pushing member 102, the softened material becomes trapped in the trap recess 100. As a result, a container for the softened material is prepared, whereby formation of a raised portion due to blocking of the softened material can be prevented. Meanwhile, the softened material flows toward the anode 16 and penetrates into the gas diffusion layer 28 because the gas diffusion layer 28 is made of a porous body.

During this step, lower surfaces of the membrane electrode assembly 10 and the resin frame 82 are held in contact with the surface of the positioning jig 96, such that the membrane electrode assembly 10 and the resin frame 82 are cooled by the positioning jig 96. Such cooling takes place because, as described above, the coolant is circulated in the first coolant passage of the positioning jig 96. Consequently, areas other than the protrusion 98 and the portion in the vicinity of the protrusion are not excessively heated. Thus, warping of the membrane electrode assembly 10 and the resin frame 82 is prevented from occurring.

Thereafter, the pressing machine is operated again, the pressing machine mounting board 148 is raised, and the second support board 134 and the heat insulation board 132 are raised. As a result, the heating block 130, the heating member 108, and the structure pushing member 104 are raised.

Accompanying elevation of the second support board 134 and the heat insulation board 132, the coil spring 142 is extended, and an elastic force thereof acts on the spring bearing board 138 and the structure pushing member 104. In addition, the lower surface of the head of the connecting bolt 136 is placed on the upper surface of the second support board 134.

Figure 15:
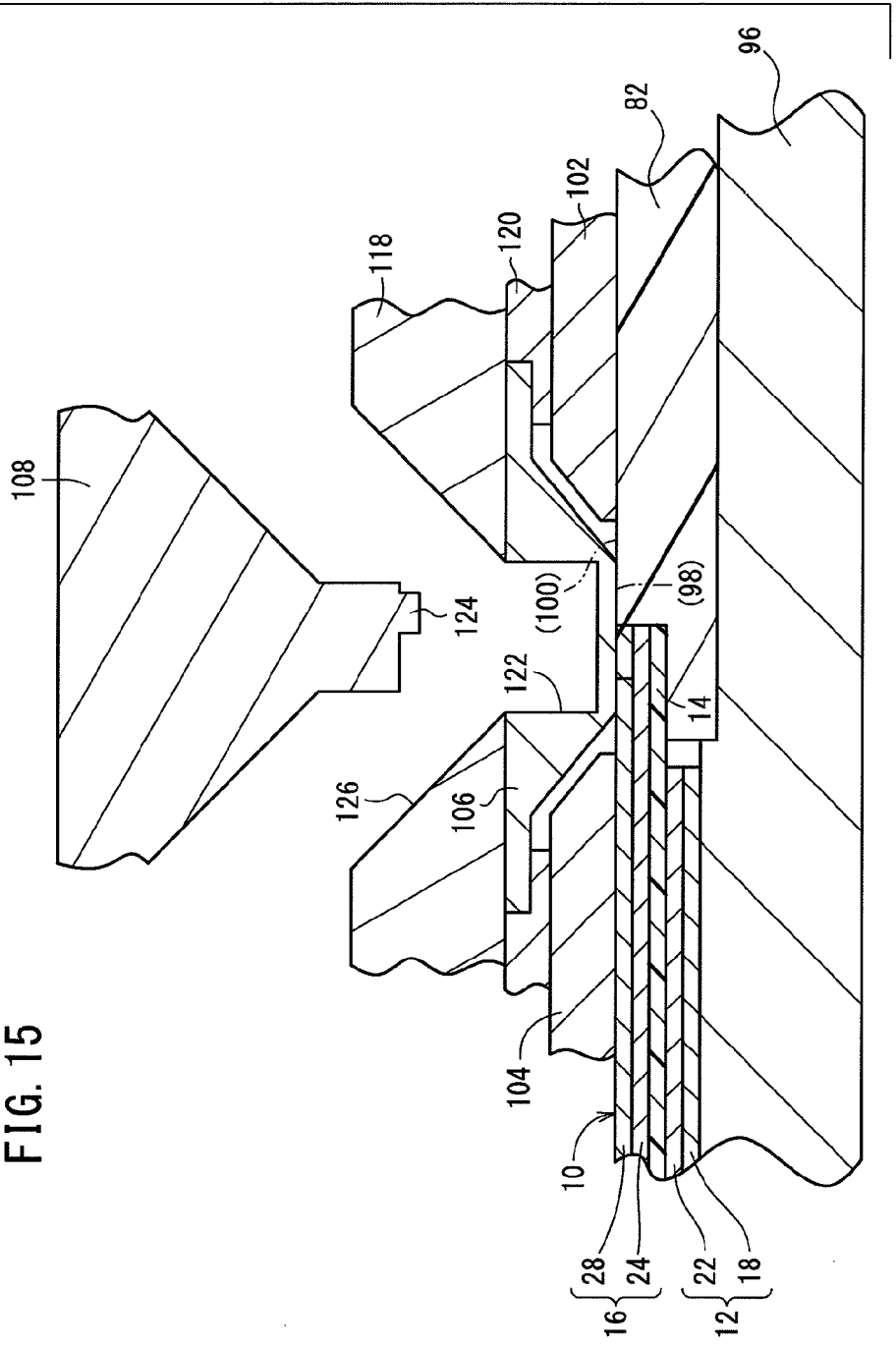
FIG. 15 is a schematic front view of the heating member, which is raised and separated away from the pressing member following the step shown in FIG. 14.

When the pressing machine mounting board 148 is raised, the second rod 152 of the second cylinder 150 extends at a speed corresponding to the raising speed. Therefore, the cooling block 116, the cooling conduction block 118, and the pressing member 106 are continuously kept in contact with upper surfaces of the membrane electrode assembly 10 and the resin frame 82. Due to this operation, as shown in FIG. 15, the heating member 108 moves away from the pressing member 106. Heating of the resin frame 82 is stopped upon separation of the heating member 108 from the pressing member 106.

The heating member 108 is not brought into direct contact with the resin frame 82. Therefore, the softened resin material does not become attached to the heating member 108, and the resin material does not extend in the form of strings during the step of raising the heating member 108. Thus, stringing of the resin material is prevented.

The coolant is circulated in the second coolant passage in the cooling block 116. After heat exchange has taken place between the coolant and the heating member 108, the used coolant is discharged from the cooling block 116, and another coolant having a sufficiently low temperature is supplied to the cooling block 116. Therefore, the softened material, which is introduced into the gas diffusion layer 28, is efficiently cooled and hardened in a relatively short period of time. Consequently, the gas diffusion layer 28 (anode 16) and the resin frame 82 are integrally bonded, and the fuel cell assembly 80 is obtained as a joined assembly.

Figure 16:
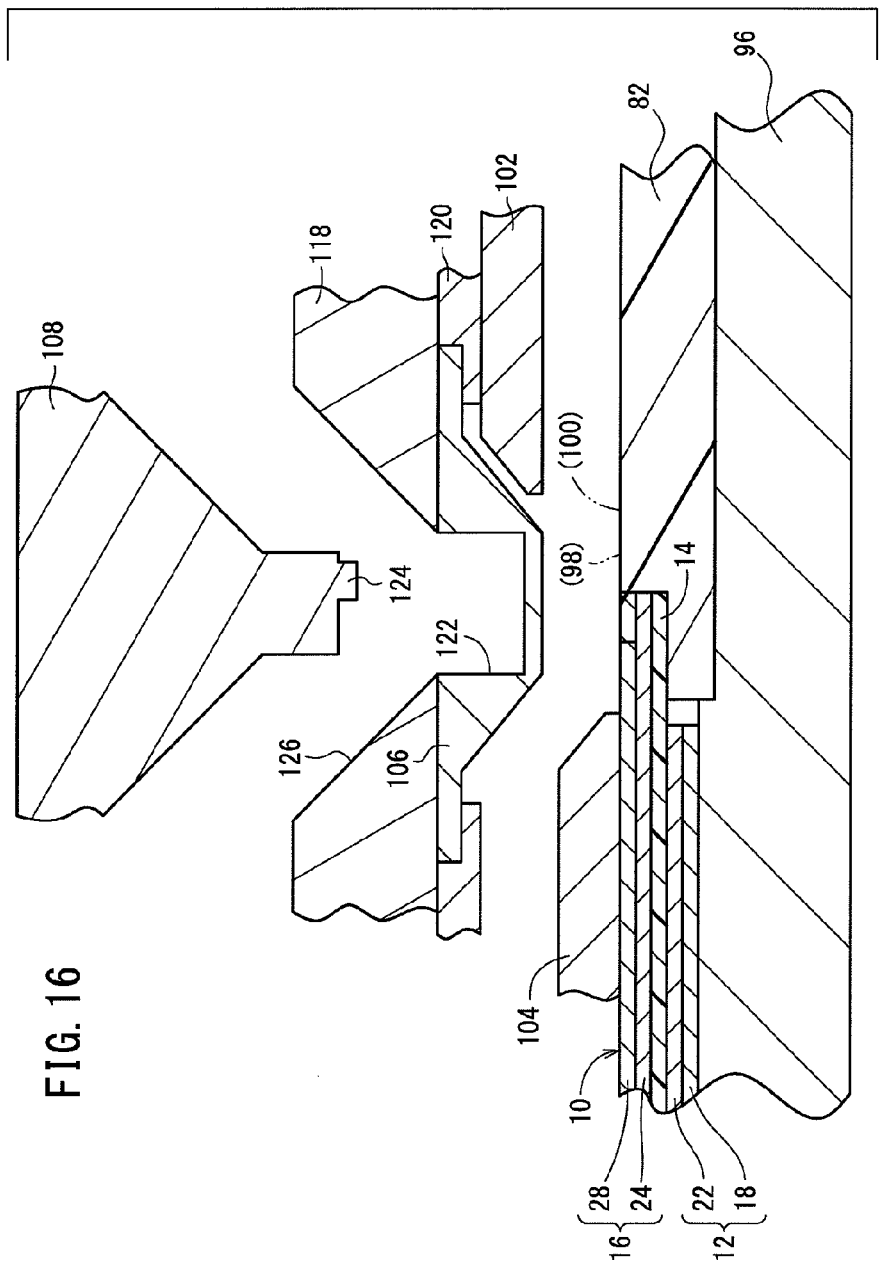
FIG. 16 is a schematic front view of the pressing member, which is raised and separated away from a joined assembly (fuel cell assembly) following the step shown in FIG. 15.

After cooling is carried out in the above-described manner, extension of the second rod 152 of the second cylinder 150 is stopped. As shown in FIG. 16, the pressing machine mounting board 148 is raised, and the cooling block 116, the cooling conduction block 118, and the pressing member 106 are moved away from the fuel cell assembly 80. Thus, the fuel cell assembly 80 is separated from the pressing member 106 and the heating member 108. Furthermore, the first rod 112 of the first cylinder 110 is moved backward and shrunk, and the frame pushing member 102 is moved away from the resin frame 82. Thus, the fuel cell assembly 80 separates away from the frame pushing member 102. Thereafter, the fuel cell assembly 80 may be isolated from the positioning jig 96.

The present invention is not particularly limited to the two embodiments described above. Various changes and modifications may be made to the embodiments without departing from the scope of the invention.

For example, in the exemplary embodiment shown in FIG. 7, the elastomer 70 (see FIG. 6) may also be interposed between the other resin frame 72 and the lower surface of the electrolyte membrane 14.

Furthermore, the protrusions 62, 74, 98 are not essential to produce the assembly. Only a portion in the vicinity of the recess 30 or the housing hole 32 may be softened and introduced into the gas diffusion layer 18, 28.

Although according to the second embodiment, the first coolant passage is formed in the positioning jig 96 and the second coolant passage is formed in the cooling block 116, one or both of the coolant passages may be omitted.

In addition, use of the bonding apparatus 90 is not limited to the production of a fuel cell assembly 80. Consequently, the porous member and the resin member are not limited to the gas diffusion layer 28 and the resin frame 82, respectively.

The bonding apparatus 90 can be used for production of any type of joined assembly that utilizes the introduction of a softened resin material into a porous member.

The invention claimed is:

1. A method for producing a fuel cell assembly containing a membrane electrode assembly and a resin frame for supporting the membrane electrode assembly, wherein the membrane electrode assembly contains an anode and a cathode with a solid polymer electrolyte membrane interposed therebetween, the method comprising the steps of:
placing the electrolyte membrane and one of the anode and the cathode in a recess, which extends from one surface toward another surface of the resin frame, and placing the other of the anode and the cathode in a housing hole, which is formed as a through-hole that extends from a bottom surface or a ceiling surface of the recess to the other surface;
heating a protrusion on an outer surface of the recess or the housing hole to generate a softened material, and pressing the protrusion in order to introduce the softened material into the anode or the cathode; and
hardening the softened material, which is introduced into the anode or the cathode, so as to bond the resin frame to the anode or the cathode.

2. The method for producing the fuel cell assembly according to claim 1, wherein, the heating is performed by laser irradiation or infrared ray irradiation, or by pressing a heated jig against the outer surface.

3. The method for producing the fuel cell assembly according to claim 1, wherein, in the pressing step, a pressing jig is pressed against the softened material, and an area of a pressing surface of the pressing jig is greater than an area of a softened portion of the resin frame.

4. The method for producing the fuel cell assembly according to claim 1, wherein, in the step of heating the outer surface of the recess or the housing hole, an elastomer is interposed between and in contact with the bottom surface or the ceiling surface of the recess and an edge of the electrolyte membrane.

5. The method for producing the fuel cell assembly according to claim 1, further comprising the steps of:
inserting another resin frame into the recess, when an edge of the electrolyte membrane is exposed on the outsides of an edge of the anode and an edge of the cathode;
heating an outer surface of the other resin frame in order to generate a softened material, and introducing the softened material into the other of the anode and the cathode that is not bonded to the resin frame; and
hardening the softened material, which is introduced into the other electrode, so as to bond the other resin frame to the other electrode.

6. The method for producing the fuel cell assembly according to claim 1, wherein a trap recess is formed in advance in the vicinity of the protrusion.

7. The method for producing the fuel cell assembly according to claim 1, wherein a load applied during the pressing step is substantially equal to a fastening pressure of a stack of the fuel cell assemblies.

8. A method for producing a joined assembly by bonding a resin member to a porous member made of a porous body, wherein the resin member has a protrusion formed in a vicinity of an edge thereof, comprising the steps of:
arranging an edge of the porous member and the edge of the resin member in facing relation to each other on a positioning jig so as to form a facing portion;
pressing the protrusion using a pressing member;
bringing a heating member into contact with the pressing member for pressing the protrusion, heating the heating member in order to transfer heat to the pressing member and the protrusion, heating the pressing member and the protrusion to generate a softened portion, and introducing the softened portion of the protrusion of the resin member into the porous member; and
separating the heating member from the pressing member, thereby stopping heating, while continuously pressing the protrusion using the pressing member, so as to harden the softened portion of the resin member that was introduced into the porous member.

9. The method for producing the joined assembly according to claim 8, wherein, in the step of stopping heating while continuously pressing the facing portion using the pressing member, at least one of the pressing member and the positioning jig is cooled.

10. The method for producing the joined assembly according to claim 8, wherein:
a recess is formed in advance in the vicinity of the protrusion on the resin member; and
a portion of the protrusion flows into the recess.

11. A bonding apparatus for bonding a resin member to a porous member made of a porous body, wherein the resin member has a protrusion formed convexly in a vicinity of an edge thereof, comprising:
a positioning jig on which the porous member and the resin member are placed such that the edge of the resin member faces an edge of the porous member;
a pressing member for pressing the protrusion;
a heating member which is heatable and which is capable of moving closer to or farther away from the pressing member;
a heating unit for heating the heating member;
a first displacement mechanism for moving the pressing member closer to or farther away from the protrusion; and
a second displacement mechanism for moving the heating member closer to or farther away from the pressing member.

12. The bonding apparatus according to claim 11, further comprising at least one of a cooling unit for cooling the pressing member and a cooling unit for cooling the positioning jig.

* * * * *